(12) United States Patent
Kusumura et al.

(10) Patent No.: US 9,600,565 B2
(45) Date of Patent: Mar. 21, 2017

(54) DATA STRUCTURE, INDEX CREATION DEVICE, DATA SEARCH DEVICE, INDEX CREATION METHOD, DATA SEARCH METHOD, AND COMPUTER-READABLE RECORDING MEDIUM

(75) Inventors: Yukitaka Kusumura, Tokyo (JP); Hironori Mizuguchi, Tokyo (JP); Dai Kusui, Tokyo (JP); Yusuke Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 759 days.

(21) Appl. No.: 13/824,740

(22) PCT Filed: Jun. 16, 2011

(86) PCT No.: PCT/JP2011/063792
§ 371 (c)(1),
(2), (4) Date: Jun. 11, 2013

(87) PCT Pub. No.: WO2012/049883
PCT Pub. Date: Apr. 19, 2012

(65) Prior Publication Data
US 2013/0262470 A1 Oct. 3, 2013

(30) Foreign Application Priority Data
Oct. 15, 2010 (JP) .................................. 2010-232896

(51) Int. Cl.
*G06F 17/30* (2006.01)
(52) U.S. Cl.
CPC .............................. *G06F 17/30622* (2013.01)

(58) Field of Classification Search
CPC ................................................. G06F 17/30622
(Continued)

(56) References Cited

U.S. PATENT DOCUMENTS 5,542,090 A * 7/1996 Henderson ........ G06F 17/30949
6,233,575 B1 * 5/2001 Agrawal ............. G06F 17/3071
(Continued)

FOREIGN PATENT DOCUMENTS

JP H10301959 A 11/1998
JP 2001216314 A 8/2001
(Continued)

OTHER PUBLICATIONS

Ben-Yitzhak, Ori, et al., "Beyond Basic Faceted Search", WSDM '08, Palo Alto, CA, Feb. 11-12, 2008, pp. 33-43.*
(Continued)

*Primary Examiner* — Robert Stevens

(57) ABSTRACT

In an inverted list of each node in a taxonomy, among each node, an inverted list of the highest node is a list of integer values indicating an identifier of search subject data, and an inverted list of a node other than the highest node, in place of the identifier, is a list of integer values indicating a position in an inverted list corresponding to a node that is higher by one than the node. Furthermore, a list of integer values in an inverted list of each node is divided into two or more blocks, and a differential value between an integer value and an integer value directly before the integer value in the block is converted into a bit string of a variable length integer code.

12 Claims, 32 Drawing Sheets

(58) Field of Classification Search
USPC .......................................................... 707/742
See application file for complete search history.

(56) References Cited

U.S. PATENT DOCUMENTS

| | | | | |
|---|---|---|---|---|
| 7,502,765 | B2* | 3/2009 | Kummamuru | G06F 17/30911 706/15 |
| 7,609,000 | B1* | 10/2009 | Sharma | H03M 7/40 314/67 |
| 7,965,207 | B2* | 6/2011 | Hendrickson | H03M 7/40 341/50 |
| 2001/0044758 | A1* | 11/2001 | Talib | G06F 17/30622 705/26.1 |
| 2008/0222117 | A1* | 9/2008 | Broder | G06F 17/30675 |
| 2009/0271179 | A1* | 10/2009 | Marchisio | G06F 17/30672 704/9 |
| 2010/0094877 | A1* | 4/2010 | Garbe | G06F 17/301 707/742 |
| 2010/0121642 | A1* | 5/2010 | Hori | G06F 17/30746 704/254 |
| 2010/0281030 | A1* | 11/2010 | Kusumura | G06F 17/30616 707/741 |
| 2011/0289040 | A1* | 11/2011 | Johnson | G06F 17/30619 706/50 |
| 2012/0059821 | A1* | 3/2012 | Li | G06F 17/30675 707/728 |
| 2013/0031133 | A1* | 1/2013 | Adzic | G06F 17/30321 707/778 |

FOREIGN PATENT DOCUMENTS

| | | |
|---|---|---|
| JP | 2003501749 A | 1/2003 |
| JP | 200673035 A | 3/2006 |
| JP | 2007102786 A | 4/2007 |
| JP | 2008140357 A | 6/2008 |

OTHER PUBLICATIONS

Lee, Yong Kyu, et al., "Index Structures for Structured Documents", DL '96, Bethesda, MD, ACM, © 1996, pp. 91-99.*

Dash, Debabrata, et al., "Dynamic Faceted Search for Discovery-driven Analysis", CIKM '08, Napa Valley, CA, Oct. 26-30, 2008, pp. 3-12.*

Fenwick, Peter, "Burrows-Wheeler compression with variable length integer codes", Software—Practice and Experience, vol. 32, John Wiley & Sons, Ltd. © 2002, pp. 1307-1316.*

Delbru, Renaud, et al., "A Node Indexing Scheme for Web Entity Retrieval", ESWC 2010, Part II, LNCS 6089, Springer-Verlag, Berlin, Germany, © 2010, pp. 240-256.*

Zhang, Jiangong, et al., "Performance of Compressed Inverted List Caching in Search Engines", WWW 2008 / Refereed Track: Search—Corpus Characterization & Search Performance, Beijing, China, Apr. 21-25, 2008, pp. 387-396.*

Zhou, Yinghua, et al., "Hybrid Index Structures for Location-based Web Search", CIKM '05, Bremen, Germany, Oct. 31-Nov. 5, 2005, pp. 155-162.*

"Variable-length quantity", Wikipedia, downloaded from: en.wikipedia.org/wiki/Variable-length_quantity on Nov. 20, 2015, pp. 1-4.*

"Inverted index", Wikipedia, downloaded from: en.wikipedia.org/wiki/Inverted_index on Nov. 20, 2015, pp. 1-3.*

The international search report for PCT/JP2011/063792 mailed on Jul. 26, 2011, 5 pages.

Zobel, Justin and Moffat, Alistair "Inverted Files for Text Search Engines". ACM Computing Surveys (New York: Association for Computing Machinery), vol. 38 No. 2 Article 6, Jul. 2006, pp. 1-56.

* cited by examiner

| d(L) | 1 | 456 | 12000 | | | |
|---|---|---|---|---|---|---|
| d(M) | 23 | 16333 | | | | |
| d(N) | 456 | | | | | |
| d(O) | 2451 | 18921 | | | | |

(b)

| d(A) | 1 | 23 | 456 | 2451 | 3443 | 12000 | 16333 | 18921 |
|---|---|---|---|---|---|---|---|---|
| d(B) | 1 | 23 | 456 | 12000 | 16333 | | | |
| d(C) | 2451 | 3443 | 18921 | | | | | |
| d(L) | 1 | 456 | 12000 | | | | | |
| d(M) | 23 | 16333 | | | | | | |
| d(N) | 456 | | | | | | | |
| d(O) | 2451 | 18921 | | | | | | |

FIG. 3

| INTEGER | γ CODE |
|---|---|
| 1 | 0 |
| 2 | 100 |
| 3 | 101 |
| 4 | 11000 |
| 5 | 11001 |
| 6 | 11010 |
| 7 | 11011 |
| 8 | 1110000 |
| ... | ... |
| 63 | 11111011111 |

FIG. 6

| NODE | ANCESTOR NODE |
|---|---|
| A | φ |
| B | A |
| C | φ |
| L | B |
| M | B |
| N | B |
| O | C |

FIG. 7

| | 1 | 2 | 3 | 4 | 5 | 6 | 7 | 8 |
|---|---|---|---|---|---|---|---|---|
| d(A) | 1 | 23 | 456 | 2451 | 3443 | 12000 | 16333 | 18921 |
| d(B) | 1 | 2 | 3 | 6 | 7 | | | |
| d(C) | 2451 | 3443 | 18921 | | | | | |
| d(L) | 1 | 3 | 4 | | | | | |
| d(M) | 2 | 5 | | | | | | |
| d(N) | 3 | | | | | | | |
| d(O) | 1 | 3 | | | | | | |

FIG. 8

| i | 1 | 2 | 3 | 4 | 5 | 6 | 7 | 8 |
|---|---|---|---|---|---|---|---|---|
| tf(A) | 4 | 1 | 8 | 2 | 3 | 2 | 8 | 5 |
| tf(B) | 0 | 0 | 3 | 0 | 0 | | | |
| tf(C) | 2 | 3 | 5 | | | | | |
| tf(L) | 0 | 2 | 0 | | | | | |
| tf(M) | 0 | 0 | | | | | | |
| tf(N) | 3 | | | | | | | |
| tf(O) | 0 | 0 | | | | | | |

FIG. 20

| i | 1 | 2 | 3 | 4 | 5 | 6 | 7 | 8 |
|---|---|---|---|---|---|---|---|---|
| d(A) | 1 | 23 | 456 | 2451 | 3443 | 12000 | 16333 | 18921 |
| d(B) | 1 | 2 | 3 | 6 | 7 | | | |
| d(C) | 4 | 5 | 8 | | | | | |
| d(L) | 1 | 3 | 4 | | | | | |
| d(M) | 2 | 5 | | | | | | |
| d(N) | 3 | | | | | | | |
| d(O) | 1 | 3 | | | | | | |

FIG. 28

| NODE | CHILD NODE |
|---|---|
| root | A,C |
| A | B |
| B | L,M,N |
| C | O |

DATA STRUCTURE, INDEX CREATION DEVICE, DATA SEARCH DEVICE, INDEX CREATION METHOD, DATA SEARCH METHOD, AND COMPUTER-READABLE RECORDING MEDIUM

This application is a National Stage Entry of PCT/JP2011/063792 filed Jun. 16, 2011, which claims priority from Japanese Patent Application 2010-232896 filed Oct. 15, 2010, the contents of all of which are incorporated herein by reference, in their entirety.

TECHNICAL FIELD

The present invention relates to a data structure, an index creation device, a data search device, an index creation method, a data search method, and a computer-readable recording medium, and in particular, relates to the data structure, the index creation device, the data search device, the index creation method, the data search method, and the computer-readable recording medium which use an inverted index.

BACKGROUND ART

As a technology for searching an electronic document, for example, in Japanese Patent Laid-Open No. 2006-73035 (Patent Document 1), a configuration described below has been disclosed. That is, an electronic document search system comprises: an index storage means to store an index word, a document frequency and document identifier of a registered document including the index word, as well as an in-document frequency and appearing position of the index word within each registered document; a document division means to divide a registered document into index words which are a chain of n characters (n is an integer no less than 1); a search word division means to divide a search word into index words that are one or more n-characters chains covering the search word; a search condition analysis means to generate a search condition tree synthesized with a position operator which specifies distances among appearing positions of two or more index words when the search word is divided into two or more index words; and a search condition evaluation means to carryout a search result synthesizing processing based on the search condition tree and acquire a search result.

In addition, a method described below has been disclosed in Japanese Patent Laid-Open No. 2008-140357 (Patent Document 2). That is, in the case where a document identification number is compressed into a byte string by Variable byte method, w bits within the byte string is used for representing the number of appearing of this index word within this document, and x bits are used for representing attribute information of a posting. The number of appearing which cannot be represented in w bits, after writing into the byte string a special value indicating that it is a numerical value which cannot be represented in w bits, is described by Variable byte method and is postposed. Here, x and w are integers given as parameters. In addition, a means by which a compressed posting can be read even from a position in the middle of the inverted list is made to be provided, and dichotomizing search on the inverted list is made to be possible.

In addition, a technology for searching an electronic document using an inverted index has been described also in Zobel, Justin and Moffat, Alistair "Inverted Files for Text Search Engines", ACM Computing Surveys (New York: Association for Computing Machinery), pp. 8-9 pp. 19-23 Vol. 38 No. 2 Article 6, July 2006 (Non-patent Document 1).

In addition, an example of a data compression technology in a tree structure has been disclosed in National Publication of International Patent Application No. 2003-501749 (Patent Document 3). That is, a memory is executed as a directory structure body comprising a tree shape hierarchy having a node on a large number of different hierarchy levels. In this directory structure body, a pointer is added first to a width-compressed node that is a node where a table includes an element of a given first number. In order to make performance of a functional tree structure into the maximum, addition of a pointer indicating each width-compressed node is allowed as far as the number of pointers within the node corresponds to a prescribed threshold value smaller than the above-mentioned first number. The width-compressed node, as soon as the number of pointers which can be received in the width-compressed node exceeds the above-mentioned threshold value, is converted into a cluster of nodes formed of a parent node and individual child node.

PRIOR ART DOCUMENT

Non-Patent Document

Non-patent Document 1: Zobel, Justin and Moffat, Alistair "Inverted Files for Text Search Engines", ACM Computing Surveys (New York: Association for Computing Machinery), pp. 8-9 pp. 19-23 Vol. 38 No. 2 Article 6, July 2006

Patent Document

Patent Document 1: Japanese Patent Laid-Open No. 2006-73035

Patent Document 2: Japanese Patent Laid-Open No. 2008-140357

Patent Document 3: National Publication of International Patent Application No. 2003-501749

SUMMARY OF THE INVENTION

Problems to be Solved by the Invention

By the way, in the case of searching an electronic document, a data set (hereinafter, referred to as a taxonomy) of a directed acyclic graph (DAG: Directed Acyclic Graph) comprised of two or more tags and two or more semantic classes is considered to be used.

Here, first, the taxonomy and search subject data are made to be defined.

FIG. 31 is a figure showing specifically an example of the taxonomy and search subject data in an index creation device and data search device according to a first embodiment of the present invention.

With reference to FIG. 31, as mentioned above, the taxonomy means a directed acyclic graph comprised of two or more tags and two or more semantic classes.

The tag means a leaf node in the graph, and information having at least a label. The label means a character string representing the tag. In FIG. 31, the tag is made to be represented with a rectangle, and the label of each tag is made to be represented as a character string enclosed with " ".

In addition, the semantic class is information representing a concept bringing tags together, and has the label which is a character string, or an identifier. In FIG. 31, each semantic class is made to be represented with an ellipse, and the label of each semantic class is made to be described in the ellipse.

Besides, hereinafter, with respect to X which is an arbitrary character or a symbol, a tag or semantic class having the label "X" may be represented as an "X node".

In semantic classes and tags in the taxonomy, there exists a semantic inclusion relation. In FIG. 31, this relation is indicated with an arrow. For example, a "company node" is a higher order concept of an "electrical equipment maker node", and the "electrical equipment maker node" is the higher order concept of a "Yamamoto electric node".

In addition, in this inclusion relation, a synonym relation is also included. For example, it may be assumed that the company "Yamamoto electric" is referred to as an abbreviation "yamaden". Then, it may be also possible to regard the "Yamamoto electric node" as a higher order concept of a "yamaden node".

The search subject data means data connected with a tag in the taxonomy, and has a unique identifier capable of identification from other search subject data.

As an example of the search subject data, for example, news articles or the like correspond to this, and each article has an identifier represented by an integer, and has as a tag a word appearing within each article.

In FIG. 31, indicated are 7 pieces of search subject data, and an identifier corresponding to each of search subject data. For example, the search subject data having an identifier "001" includes the data 「山本電気」 ("Yamamoto electric"), and has a relation with the "Yamamoto electric node" in the taxonomy.

The data search device according to the first embodiment of the present invention, when information indicating a certain semantic class or tag is inputted, returns a list of identifiers indicating data set which can be reached from the node specified by this information in the taxonomy.

For example, when the tag "yamaden" is inputted into the data search device, the data search device returns two identifiers of 003 and 004 as search subjects. In addition, when the semantic class 「山陽食品」 ("Sanyo foods") is inputted into the data search device, the data search device returns four identifiers of 004, 005, 006, and 007 as search subjects.

Next, a little more detailed description with respect to a model indicated in FIG. 31 will be performed.

FIG. 32 is a figure showing conceptually an example of a taxonomy and search subject data in the index creation device and data search device according to the first embodiment of the present invention.

In FIG. 32, an example of the taxonomy is indicated, and an ellipse represents a semantic class, and a rectangle represents a tag. d(X) connected from each tag represents a set of identifiers of the search subject data which can be reached from a node X.

Then, d(X) corresponding to a semantic class X, in a tag set Y which can be reached from the semantic class X, will become Union of d (y) (y⊂Y) of each tag.

For example, d(B)=d(L)∪d(M)∪d(N), and d(A)=d (L) ∪d(M)∪d(N)∪d(O).

In an electronic document search using the taxonomy like this, in the case where a size of the taxonomy becomes large, there is a problem that an inquiry with respect to the semantic class of a higher order can not be realized at high speed in the taxonomy.

That is, as a conventional method to use a inverted index, two types of a method A to use an inverted index corresponding to only a tag and a method B to use an inverted index corresponding to all the nodes can be considered.

In the case of adopting the method A, in order to refer to an inverted list corresponding to a semantic class of higher order, required are processing time for calculating a set of tags which can be reached, and processing time for referring each to the inverted list corresponding to the set of tags acquired by this calculation result and for calculating Union (union of sets) of the data set. Consequently, if the method A is adopted, in the case where a size of the taxonomy and a data set have become large, the processing time of these two will have increased.

In addition, in the case of adopting the method B, although the processing can be finished only by reading an associated inverted list at the time of searching, an amount of data which must be stored increases overwhelmingly. In the current computer architecture, in the case where there exist data which may overflow a main storage, since accesses to an auxiliary storage arise, an inquiry speed may be deteriorated if the method B is adopted.

However, in Patent Documents 1 to 3 and Non-patent Document 1, in the electronic document search using the taxonomy, a configuration for solving the above-mentioned problems has not been disclosed.

This invention has been accomplished for solving the above-mentioned problem, and the object is to provide a data structure, an index creation device, a data search device, an index creation method, a data search method, and a computer-readable recording medium which are capable of achieving reduction of a data volume for search processing and improving a speed of the search processing.

Means for Solving the Problems

For solving the problems mentioned above, a data structure according to an aspect of the present invention is the data structure, in a taxonomy having a tag with respect to search subject data, configured to take out a set of search subject data which can be reached from each node in the taxonomy comprising: data for ancestor reference indicating an ancestor node that is a higher node of the each node in the taxonomy; and data for an inverted list where an inverted list of the each node is included, and among the each node, an inverted list of a node where the ancestor node is registered in the data for ancestor reference is a list of integer values indicating a position within an inverted list corresponding to registered the ancestor node, and furthermore, a list of integer values in an inverted list of the each node is divided into two or more blocks, and a differential value between an integer value and an integer value directly before the integer value in the block is converted into a bit string of a variable length integer code.

For solving the problems mentioned above, an index creation device according to an aspect of the present invention is the index creation device, in a taxonomy having a tag with respect to search subject data, configured to create an inverted list used for taking out a set of search subject data which can be reached from each node in the taxonomy, wherein a list of integer values in an inverted list of the each node is divided into two or more blocks, and a differential value between an integer value and an integer value directly before the integer value in the block is converted into a bit string of a variable length integer code, and the index creation device comprises: an ancestor node determination part configured to select one ancestor node that is a higher node of the node for every node in the taxonomy, and generate data for ancestor reference indicating selected the ancestor node; an ancestor node search part configured to generate an ancestor node list indicating one or more ancestor nodes of a tag in the taxonomy based on the data for ancestor reference; and an ancestor number converting part configured to, upon receiving an identifier of search subject data, with respect to the highest node among each the node in the ancestor node list, adds the identifier as a element of a corresponding inverted list, and with respect to a node other than the highest node, as a element of a corresponding inverted list, in place of the identifier, adds an integer value indicating a position in an inverted list corresponding to a node that is higher by one than the node.

For solving the problems mentioned above, a data search device according to an aspect of the present invention is the data search device, in a taxonomy having a tag with respect to search subject data, configured to take out a set of search subject data which can be reached from a specified node specified in the taxonomy comprising: an ancestor number inverted list storage part configured to store data for an inverted list where an inverted list of each node in the taxonomy is included, and among the each node, an inverted list of the highest node is a list of integer values indicating an identifier of the search subject data, and an inverted list of a node other than the highest node, in place of the identifier, is a list of integer values indicating a position in an inverted list corresponding to anode that is higher by one than the node, and furthermore, a list of integer values in an inverted list of the each node is divided into two or more blocks, and a differential value between an integer value and an integer value directly before the integer value in the block is converted into a bit string of a variable length integer code; and an identifier converting part configured to, upon receiving information indicating the specified node, based on the data for an inverted list, create a list of identifiers of the search subject data corresponding to the specified node by repeating processing to take out an integer value of the inverted list corresponding to a higher node of the specified node, which corresponds to the position indicated by an integer value of the inverted list corresponding to the specified node until taking out the identifier of the inverted list corresponding to the highest node.

For solving the problems mentioned above, an index creation method according to an aspect of the present invention is the index creation method, in a taxonomy having a tag with respect to search subject data, configured to create an inverted list used for taking out a set of search subject data which can be reached from each node in the taxonomy, wherein a list of integer values in an inverted list of the each node is divided into two or more blocks, and a differential value between an integer value and an integer value directly before the integer value in the block is converted into a bit string of a variable length integer code, and the index creation method comprises: a step to, for every node in the taxonomy, select one ancestor node that is a higher node of the node, and generate data for ancestor reference indicating selected the ancestor node; a step to generate an ancestor node list indicating one or more ancestor nodes of a tag in the taxonomy based on the data for ancestor reference; and a step to, upon receiving an identifier of search subject data, with respect to the highest node among each node in the ancestor node list, add the identifier as a element of a corresponding inverted list, and with respect to a node other than the highest node, as a element of a corresponding inverted list, in place of the identifier, add an integer value indicating a position in an inverted list corresponding to a node that is higher by one than the node.

For solving the problems mentioned above, a data search method according to an aspect of the present invention is the data search method, in a taxonomy having a tag with respect to search subject data, configured to take out a set of search subject data which can be reached from a specified node specified in the taxonomy, comprising: a step to acquire data for an inverted list where an inverted list of each node in the taxonomy is included, and an inverted list of the highest node among the each node is a list of integer values indicating an identifier of the search subject data, and an inverted list of a node other than the highest node, in place of the identifier, is a list of integer values indicating a position in an inverted list corresponding to a node that is higher by one than the node, and furthermore, a list of integer values in an inverted list of the each node is divided into two or more blocks, and a differential value between an integer value and an integer value directly before the integer value in the block is converted into a bit string of a variable length integer code; and a step to, upon receiving information indicating the specified node, based on the data for an inverted list, create a list of identifiers of the search subject data corresponding to the specified node by repeating processing to take out an integer value of the inverted list corresponding to a higher node of the specified node, which corresponds to the position indicated by an integer value of the inverted list corresponding to the specified node until taking out the identifier of the inverted list corresponding to the highest node.

For solving the problems mentioned above, a computer-readable recording medium according to an aspect of the present invention is the computer-readable recording medium, in a taxonomy having a tag with respect to search subject data, in which recorded is an index creation program to create an inverted list used for taking out a set of search subject data which can be reached from each node in the taxonomy, wherein a list of integer values in an inverted list of the each node is divided into two or more blocks, and a differential value between an integer value and an integer value directly before the integer value in the block is converted into a bit string of a variable length integer code, and the index creation program is a program configured to make a computer execute the steps of: selecting, for every node in the taxonomy, one ancestor node that is a higher node of the node, and generating data for ancestor reference indicating selected the ancestor node; generating an ancestor node list indicating one or more ancestor nodes of a tag in the taxonomy based on the data for ancestor reference; and upon receiving an identifier of the search subject data, with respect to the highest node among each the node in the ancestor node list, adding the identifier as a element of a corresponding inverted list, and with respect to a node other than the highest node, as a element of a corresponding inverted list, in place of the identifier, adding an integer value indicating a position in an inverted list corresponding to a node that is higher by one than the node.

For solving the problems mentioned above, a computer-readable recording medium according to an aspect of the present invention is the computer-readable recording medium, in a taxonomy having a tag with respect to search subject data, in which recorded is data search program to take out a set of search subject data which can be reached from a specified node specified in the taxonomy, the data search program being a program configured to make a computer execute the steps of: acquiring data for an inverted list where an inverted list of each node in the taxonomy is included, and an inverted list of the highest node among the each node is a list of integer values indicating an identifier of the search subject data, and an inverted list of a node other than the highest node, in place of the identifier, is a list of integer values indicating a position in an inverted list corresponding to a node that is higher by one than the node, and furthermore, a list of integer values in an inverted list of the each node is divided into two or more blocks, and a differential value between an integer value and an integer value directly before the integer value in the block is converted into a bit string of a variable length integer code; and upon receiving information indicating the specified node, based on the data for an inverted list, creating a list of identifiers of the search subject data corresponding to the specified node by repeating processing to take out an integer value of the inverted list corresponding to a higher node of the specified node, which corresponds to the position indicated by an integer value of the inverted list corresponding to the specified node until taking out the identifier of the inverted list corresponding to the highest node.

Effect of the Invention

According to the present invention, reduction of a data volume for search processing and improving a speed of the search processing can be achieved.

BRIEF DESCRIPTION OF THE DRAWINGS

FIG. 1 (a) shows an example of a data structure using an inverted index. FIG. 1 (b) shows another example of a data structure using an inverted index;

FIG. 3 is a figure showing an example of the variable length integer code in the index creation device and data search device according to the first embodiment of the present invention;

FIG. 6 is a figure showing an example of data for an ancestor reference stored in the ancestor node storage part in the information-processing device according to the first embodiment of the present invention;

FIG. 7 is a figure showing an example of an ancestor number inverted list stored in the ancestor number inverted list storage part in the information-processing device according to the first embodiment of the present invention;

FIG. 8 is a figure showing an example of a frequency list stored in the frequency list storage part in the information-processing device according to the first embodiment of the present invention;

FIG. 20 is a figure showing an example of an ancestor number inverted list stored in the ancestor number inverted list storage part in the information-processing device according to the first embodiment of the present invention;

FIG. 23 is a flow chart indicating a procedure of the processing Node-in;

FIG. 28 is a figure showing an example of information stored in the child node storage part 21;

BEST MODES FOR CARRYING OUT THE INVENTION

Figure 2:
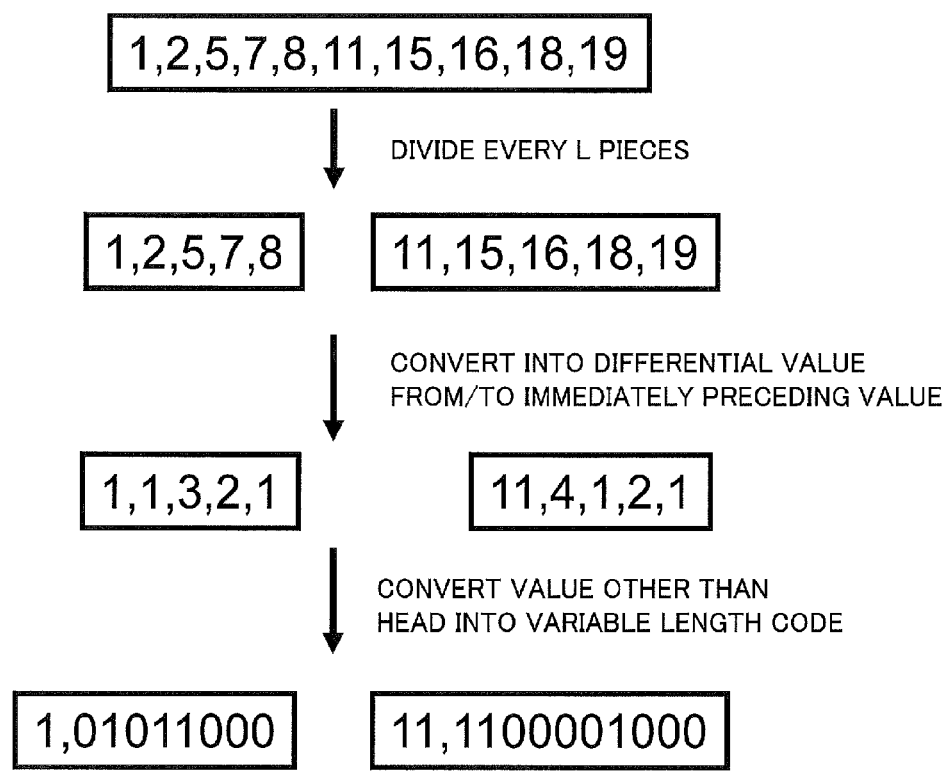
FIG. 2 is a figure showing an example of a compression method of an inverted list in the index creation device and data search device according to the first embodiment of the present invention.

Hereinafter, an embodiment of the present invention will be described using the figures. It is noted that the same reference character will be given to the same or corresponding part in the figures, and thus the description will not be repeated.

First Embodiment

A data search device according to a first embodiment of the present invention provides a function where X indicating a node within the taxonomy is inputted and d(X) is made to be returned. As a method to realize a function like this, it is considered to use an inverted index.

FIG. 1(a) shows an example of a data structure using an inverted index. FIG. 1(b) shows another example of a data structure using an inverted index.

FIG. 1(a) shows an inverted index created with respect to a tag within the taxonomy. In this inverted index, each row represents an inverted list of each tag.

For example, a tag L is associated with search subject data No. 1, No. 456, and No. 12000, and a tag M is associated with search subject data No. 23 and No. 16333.

A data search device using this inverted index, in the case where a tag is given as an input, returns data of a row corresponding to this tag among each row in the inverted index. In addition, in the case where a semantic class is given as an input, this data search device searches a set of tags which can be reached in the taxonomy, and takes out d(X) each corresponding to each tag, and calculates and returns Union of the taken-out d(X).

FIG. 1(b) shows an inverted index created with respect to all the nodes within the taxonomy. In this inverted index, each row represents an inverted list of each node.

For example, a semantic class B is associated with search subject data No. 1, No. 23, No. 456, No. 12000, and No. 16333.

A data search device using this inverted index, in the case where a node X in the taxonomy is specified, takes out data of a row corresponding to the node X among each row in the inverted index.

Next, a compression technology of an inverted list in the index creation device and data search device according to the first embodiment of the present invention will be described.

An inverted index shown in FIG. 1 is a list of an integer value corresponding to each key.

Usually, in order to keep an integer value using a computer, 4 bytes of data are required. Consequently, in order to keep these data ordinarily, it is necessary to keep an inverted list having a size of (4 bytes×the number of search subject data in which a node appears) for every node. Usually, since the size of such inverted list as this will become a large one, the following compression method is used.

FIG. 2 is a figure showing an example of a compression method of an inverted list in the index creation device and data search device according to the first embodiment of the present invention.

FIG. 2 shows an example of a method of compressing a list of ten integer values "1, 2, 5, 7, 8, 11, 15, 16, 18, 19".

In this compression method, first, the list of integer values is divided into blocks for every L pieces. Here, a case of L=5 is illustrated.

Next, with respect to the divided blocks, while the top numerical value is made to be left as it is, performed is processing to replace the subsequent numerical value with a differential value from/to the immediately preceding numerical value.

Next, using a variable length integer code, these differential values are made to be represented. Here, the variable length integer code means an integer string coding method to represent a short integer with a short bit length and represent a long integer with a long bit length. An example of the variable length integer code is described in Non-patent Document 1.

FIG. 3 is a figure showing an example of the variable length integer code in the index creation device and data search device according to the first embodiment of the present invention.

In FIG. 3, an example of a γ code is indicated as an example of the variable length integer code. For example, an integer 1 is represented with 0 and an integer 2 is represented with 100.

A reason why such compression method as indicated in FIG. 2 is effective is as follows. That is, first, by representing an integer value with a differential value, the integer value of an inverted list becomes small. Then, by using a variable length integer code, a data length becomes short. Thereby, compression of an inverted list will become possible.

Furthermore, based on creating a block in every L pieces, by performing decoding and addition by L times at most, values of any positions in the original inverted list can be taken out.

[Configuration and Basic Operation]

The information processing device provided with index creation device and data search device according to the first embodiment of the present invention, typically, includes a computer which has a general-purpose architecture as a basic structure, and provides various functions described later by executing a program installed in advance. Generally, a program like this circulates in a state of being stored in a recording medium such as a flexible disk (Flexible Disk) and a CD-ROM (Compact Disk Read Only Memory), or via a network, etc.

A program according to the first embodiment of the present invention may be provided with being incorporated in a part of other programs. Also in this case, a program itself according to the first embodiment of the present invention does not include modules which other programs of the incorporation destination have as mentioned above, and the processing is executed by collaborating with the other programs. That is, as a program according to the first embodiment of the present invention, it may have a configuration which is incorporated in other programs like this.

Besides, alternatively, apart or all of functions which are provided by the program execution may be implemented as dedicated hardware circuitry.

Figure 4:
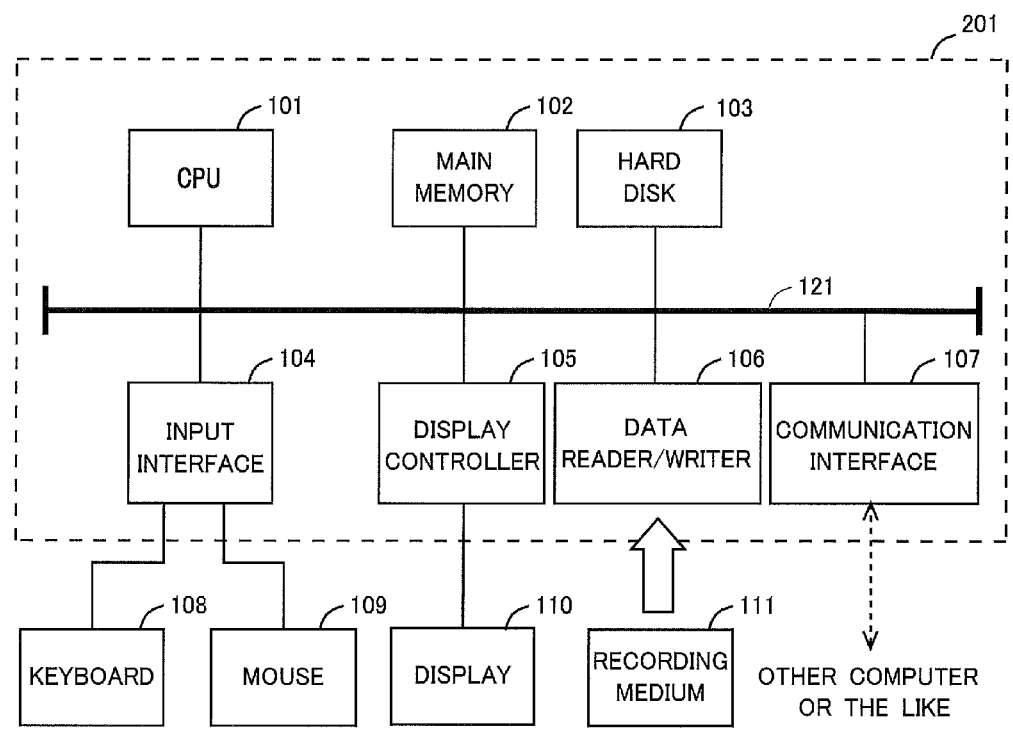
FIG. 4 is a schematic configuration diagram of an information processing device according to the first embodiment of the present invention.

FIG. 4 is a schematic configuration diagram of an information processing device according to the first embodiment of the present invention.

With reference to FIG. 4, a information processing device 201 comprises: a CPU (Central Processing Unit) 101 which is an arithmetic processing unit; a main memory 102 and a hard disk 103; an input interface 104; a display controller 105; a data reader/writer 106; and a communication interface 107.

Each of these parts is connected in a manner where data communication is possible mutually via a bus 121.

The CPU 101 carried out various calculations by reading out programs (code) stored in the hard disk 103 and writing to the main memory 102, and executing these in prescribed order. The main memory 102 typically is a volatile storage device such as a DRAM (Dynamic Random Access Memory), and holds data etc. which indicate various arithmetic processing results in addition to programs read from the hard disk 103.

The hard disk 103 is nonvolatile magnetic storage device, and various setting values etc. are stored in addition to the programs executed by the CPU101. Programs installed on this hard disk 103 circulate in a state of being stored in a recording medium 111 as described later. Besides, in addition to the hard disk 103, or in place of the hard disk 103, a semiconductor memory such as a flash memory may be adopted.

The input interface 104 intermediates data transmission between the CPU101 and a keyboard 108, a mouse 109 and an input unit such as a touch panel which is not illustrated. That is, the input interface 104 accepts an input from the outside, such as operation command given by a user operating the input unit.

The display controller 105 is connected with a display 110 which is a typical example of a display unit, and controls display on the display 110. That is, the display controller 105 displays to a user a result or the like of image processing by the CPU101. The display 110 is a LCD (Liquid Crystal Display) or a CRT (Cathode Ray Tube), for example.

The data reader/writer 106 intermediates data transmission between the CPU101 and the recording medium 111. That is, the recording medium 111 circulates in a state where programs etc. executed by the information processing device 201 is stored, and the data reader/writer 106 reads the programs from this recording medium 111. In addition, the data reader/writer 106, in response to an internal command of the CPU101, writes a processing result, etc. in the information processing device 201 to the recording medium 111. Besides, the recording medium 111 is, for example, a general-purpose semiconductor storage device such as a CF (Compact Flash) and a SD (Secure Digital), a magnetic storage medium such as a flexible disk (Flexible Disk), or an optical storage medium such as a CD-ROM (Compact Disk Read Only Memory).

The communication interface 107 intermediates data transmission between the CPU101 and a personal computer, a server device or the like. The communication interface 107, typically, has a communication function of Ethernet® or a USB (Universal Serial Bus). Besides, in place of a configuration where programs stored in the recording medium 111 are installed on the information processing device 201, programs downloaded from a distribution server etc. via the communication interface 107 may be installed on the information processing device 201.

To the information processing device 201, other output apparatuses, such as a printer, may be connected as necessary.

[Control Structure]

Next, a control structure for providing an index creation function and data search function in the information-processing device 201 will be described.

Figure 5:
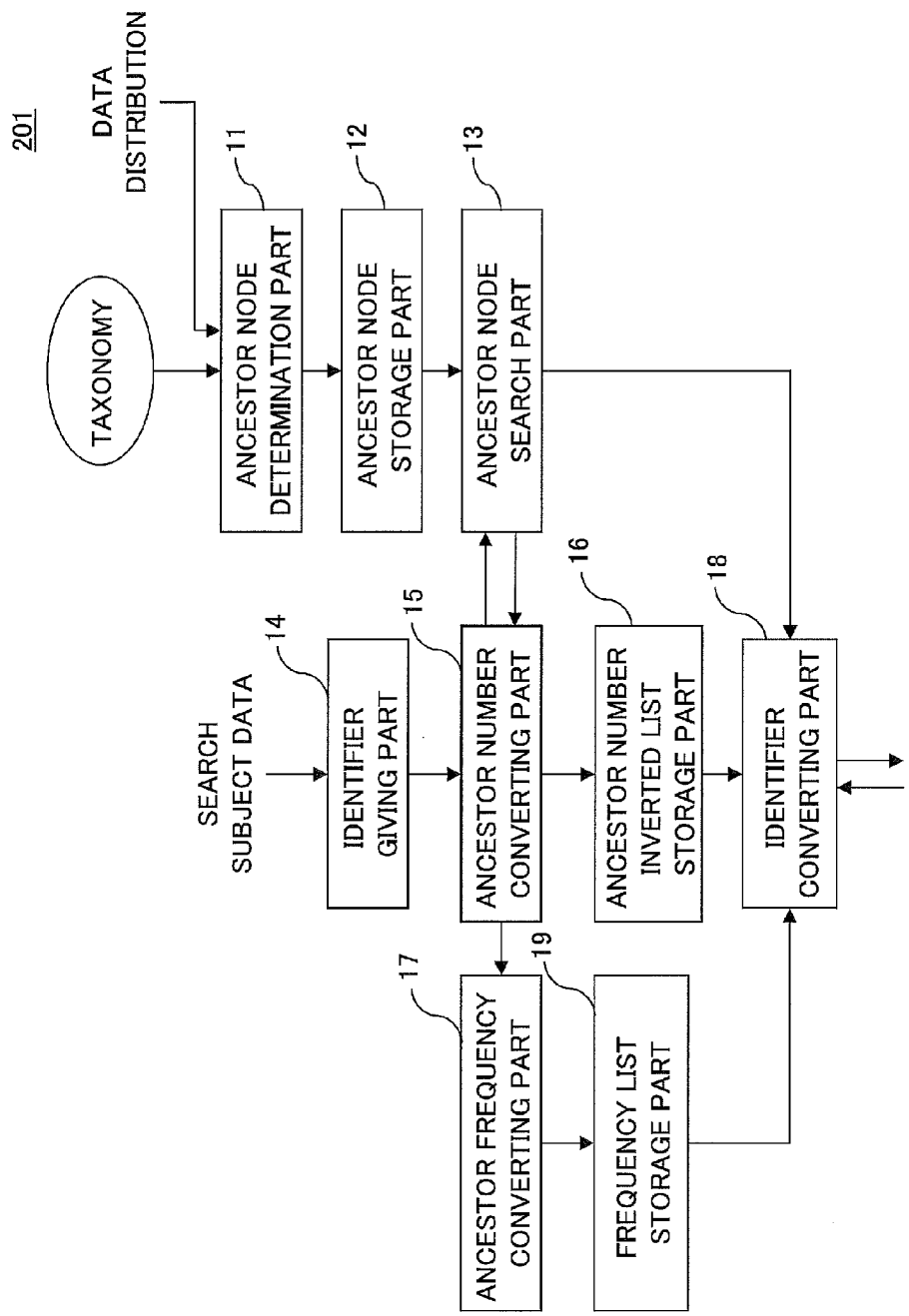
FIG. 5 is a block diagram showing a control structure which an information-processing device according to the first embodiment of the present invention provides.

FIG. 5 is a block diagram showing a control structure which an information-processing device according to the first embodiment of the present invention provides.

Each block of the information-processing device 202 shown in FIG. 5 is provided by reading out programs (code) etc. stored in the hard disk 103 and writing to the main memory 102, and making the CPU 101 execute them. Besides, a part or all of control structures shown in FIG. 5 may be realized by dedicated hardware and/or a wiring circuit.

With reference to FIG. 5, the information-processing device 201, as a control structure, comprises: an ancestor node determination part 11; an ancestor node search part 13; an identifier giving part 14; an ancestor number converting part 15; an ancestor frequency converting part 17; and an identifier converting part 18. In addition, the information-processing device 201 comprises: an ancestor node storage part 12; an ancestor number inverted list storage part 16; and a frequency list storage part 19. These storage parts correspond to the main memory 102 or hard disk 103 indicated in FIG. 4.

CPU101 is generally constituted of many units other than each part shown in FIG. 5, and however, other units are not illustrated for simplicity of description.

The ancestor node determination part 11, upon receiving the taxonomy and frequency information indicating a frequency distribution in a search subject data set of each node within the taxonomy, with respect to each node, determines an ancestor node to be registered into the ancestor node storage part 12.

The ancestor node storage part 12 stores one ancestor node of each node determined by the ancestor node determination part 11.

The ancestor node search part 13, upon receiving a certain tag, refers to the ancestor node storage part 12, and takes out all the ancestor nodes that are higher nodes of this tag.

The identifier giving part 14, upon receiving search subject data comprising one or more tags and a frequency of each tag, gives an identifier to this search subject data and outputs it to the ancestor number converting part 15.

The ancestor number inverted list storage part 16 keeps an inverted list for every label indicating a node within the taxonomy.

The ancestor number converting part 15, upon receiving from the identifier giving part 14 search subject data with an identifier given, takes out a set of ancestor nodes using the ancestor node search part 13 for every tag within the search subject data. Then, the ancestor number converting part 15 orders a set of ancestor nodes corresponding to each tag as a trie structure, and outputs to the ancestor frequency converting part 17 an identifier, a trie structure, and a frequency with respect to each tag.

In addition, the ancestor number converting part 15, after adding an identifier to an inverted list which corresponds to a node corresponding to the highest order among a set of ancestor nodes within the ancestor number inverted list storage part 16, memorizes the position where the identifier has been added, and to an inverted list with respect to a node corresponding to the next higher order of this node, adds the position with respect to the ancestor node which has been memorized most recently. Then, the ancestor number converting part 15, further, repeats such processing as this also with respect to an inverted list of a lower node.

The ancestor frequency converting part 17, upon receiving from the ancestor number converting part 15 an identifier, a trie structure in which ancestor nodes of each tag are brought together, and a frequency with respect to each tag, calculates a frequency corresponding to each ancestor node, and after adding the frequency to an inverted list which corresponds to a node corresponding to the highest order among a set of ancestor nodes within the frequency list storage part 19, memorizes the frequency which has been added, and compares a frequency in an inverted list with respect to a node corresponding to the next higher order of this node with the frequency which has been memorized most recently, and if equal, "0" is made to be added, and otherwise, a frequency in this inverted list is made to be added as it is. Then, the ancestor frequency converting part 17, further, repeats such processing as this also with respect to an inverted list of a lower node.

The identifier converting part 18, upon receiving from the outside a label indicating a node within a taxonomy, after taking out a set of an ancestor node of this node using the ancestor node search part 13, takes out a inverted list corresponding to the node indicated by this label from the ancestor number inverted list storage part 16. Then, the identifier converting part 18 creates a tuple of an identifier and a corresponding frequency while referring to a position within the ancestor number inverted list storage part 16 indicated by each integer value within the inverted list and a position within the frequency list storage part 19, and outputs it after rearranging the created identifier in the order of the frequency.

Next, a data structure within the ancestor node storage part 12, ancestor number inverted list storage part 16, and frequency list storage part 19 will be described.

Figure 6:
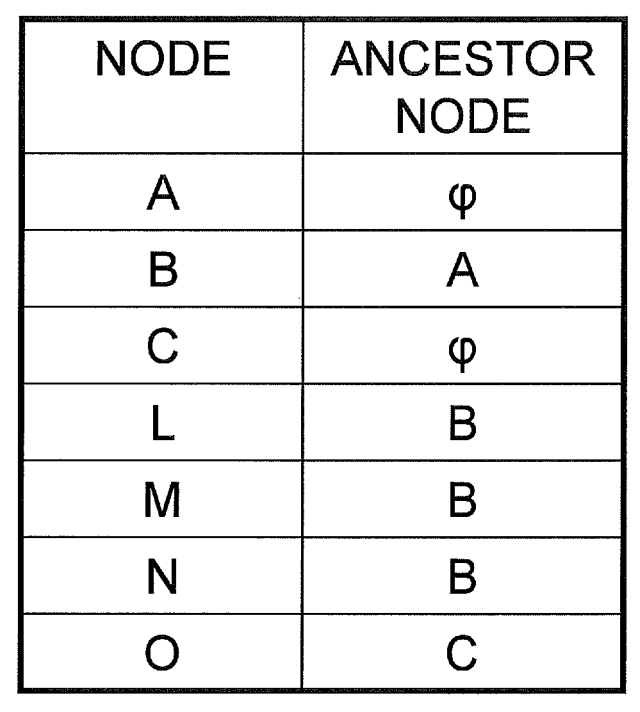

FIG. 6 is a figure showing an example of data for an ancestor reference stored in the ancestor node storage part in the information-processing device according to the first embodiment of the present invention.

With reference to FIG. 6, the ancestor node storage part 12 keeps information indicating an ancestor node of each node in the taxonomy. FIG. 6 shows an example of data for ancestor reference corresponding to the taxonomy indicated in FIG. 32.

In this data for ancestor reference, each row corresponds to each node, and an ancestor node of each node is indicated. Besides, in the case where an ancestor node is not specified, "φ" is used as a symbol indicating empty. For example, there is no ancestor node with respect to a semantic class A, and an ancestor node with respect to a semantic class B is A.

In addition, in the data for ancestor reference, even in the case where an ancestor node exists in the taxonomy actually, "φ" may be indicated. For example, in the taxonomy indicated in FIG. 32, a node A exists as a parent node with respect to a node C, and however, in the data for ancestor reference indicated in FIG. 6, "φ" where there is not an ancestor node is indicated.

Determination whether to select which node among each ancestor node with respect to each node, and whether to make an ancestor node "null" is performed by the ancestor node determination part 11. This processing will be described later.

FIG. 7 is a figure showing an example of an ancestor number inverted list stored in the ancestor number inverted list storage part in the information-processing device according to the first embodiment of the present invention.

With reference to FIG. 7, the ancestor number inverted list storage part 16, essentially, stores information indicating a row of identifiers of search subject data corresponding to each node.

However, the ancestor number inverted list storage part 16 does not necessarily keep a row of identifiers corresponding to all the nodes as an inverted list, and with respect to a node where an ancestor node is registered in the data for ancestor reference, keeps a position within the inverted list corresponding to the ancestor node.

For example, in an inverted list d (B) corresponding to a node B, five integer values of "1, 2, 3, 6, 7" are indicated. These mean positions within an inverted list corresponding to an ancestor node A of the node B. For example, in the inverted list d (B), the integer value 1 denotes a identifier 1 which is the first value in the list corresponding to the node A, and the integer value 2 denotes a identifier 23 which is the second value in the list corresponding to the node A, and the integer value 3 denotes a identifier 456 which is the third value in the list corresponding to the node A.

Besides, FIG. 7 is a figure where information which the ancestor number inverted list storage part 16 keeps is indicated in an easy-to-understand manner, and actually, the ancestor number inverted list storage part 16 does not necessarily keep data indicated in FIG. 7 as it is. Actually, the ancestor number inverted list storage part 16, with respect to each inverted list, keeps data compressed using the compression method indicated in FIG. 2, and a length of the inverted list.

FIG. 8 is a figure showing an example of a frequency list stored in the frequency list storage part in the information-processing device according to the first embodiment of the present invention.

With reference to FIG. 8, the frequency list storage part 19, with respect to each node in an inverted list stored in the ancestor number inverted list storage part 16, stores a frequency corresponding to a search subject data number.

For example, a frequency list corresponding to a node C has values of "2, 3, 5".

These values are associated with the inverted list "2451, 3443, 18921" corresponding to the node C within the ancestor number inverted list storage part 16 shown in FIG. 7. That is, the semantic class C has a frequency 2 within the search subject data No. 2451, and has a frequency 3 within the search subject data No. 3443, and has a frequency 5 within the search subject data No. 18921.

Besides, in FIG. 8, the value "0" exists, and however, as mentioned above, this does not necessarily represent a frequency "0", and means that it is equal to the frequency of the ancestor node indicated in FIG. 6. For example, since a frequency value at a head of a frequency list of the semantic class B is made to be "0", the frequency in the search subject data No. 1 of the semantic class B is the value "4" at the head of the frequency list of the ancestor node A.

Then, an operation of an information processing device according to the first embodiment of the present invention will be described using the figures In the first embodiment of the present invention, an index creation method and a data search method according to a first embodiment of the present invention is performed by making the information processing device 201 operate. Therefore, a description of the index creation method and the data search method according to the first embodiment of the present invention is substituted by an operation description of the following information processing device 201. In the following description, FIG. 5 is referred to suitably.

Processing of the information-processing device according to the first embodiment of the present invention is largely comprised of three of taxonomy registration processing, data registration processing, and data search processing.

[Taxonomy Registration Processing]

Figure 9:
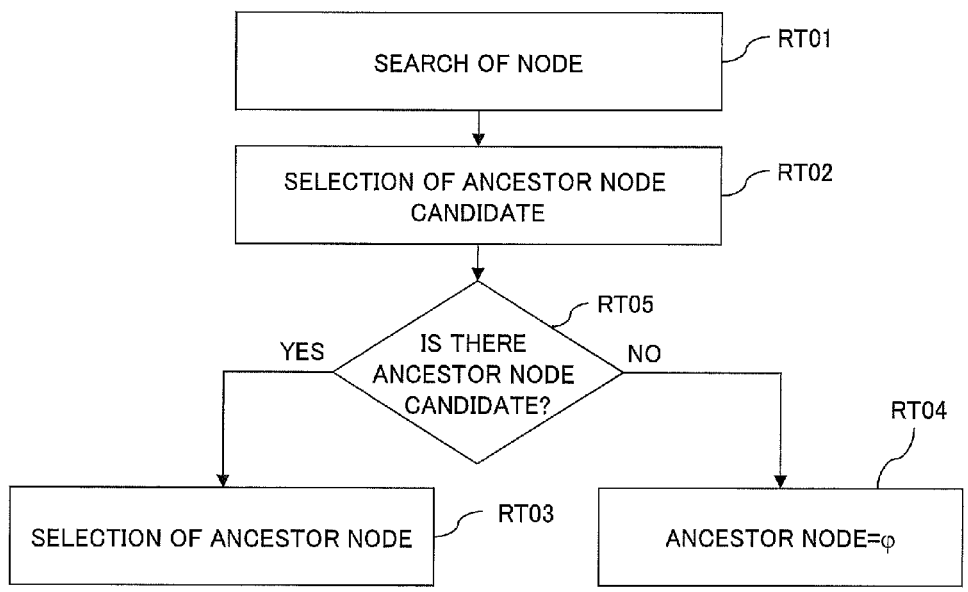
FIG. 9 is a flow chart showing an operation procedure in the case where the information-processing device according to the first embodiment of the present invention performs the taxonomy registration processing.

FIG. 9 is a flowchart showing an operation procedure in the case where the information-processing device according to the first embodiment of the present invention performs the taxonomy registration processing.

With reference to FIG. 9, the information-processing device 201, when the taxonomy and data distribution are inputted into the ancestor node determination part 11, starts the taxonomy registration processing.

Here, the data distribution means an estimated value of a data number associated with each node within the taxonomy, and in the subsequent description, the estimated value of the data number corresponding to a node X is made to be freq(X).

The ancestor node determination part 11, first, performs the next processing one by one with respect to each node.

First, the ancestor node determination part 11, with respect to the node X, collects an ancestor node list by following the taxonomy (RT01).

Here, since the taxonomy is DAG, collection processing of an ancestor node can be realized based on depth-first search or breadth-first search.

Next, the ancestor node determination part 11, among ancestor node lists, selects a candidate of an ancestor node to be registered in the ancestor node storage part 12 (RT02). In this processing, the ancestor node determination part 11 carries out such calculation as shown in the following with respect to each ancestor node Y of the node X.

$$csomp(Y,X) = entopy(All, freq(X)) - entopy(freq(Y), freq(X))$$

Here, All is a constant which means the number in a data set which a user assumes. In addition, entopy(m,n) means a lower limit of a data length in the case of creating an inverted list which takes out n data within a m-data set. Besides, entopy(m,n) can be calculated by the following equation.

$$entopy(m,n) = n \times \log(m/n) + (m-n) \times \log(m/(m-n))$$

Thereby, entopy(All,freq(X)) means a data length in the case of representing the node X as a normal inverted list, and entopy (freq (Y),freq(X)) means a data length in the case of representing the node X with reference to an inverted list of the ancestor node Y.

Consequently, comp (Y,X) represents a data length which can be compressed when the node Y is selected as an ancestor node of X.

The ancestor node determination part 11, by excluding an ancestor node where comp (Y,X) is smaller than a threshold value σ, selects a candidate of the ancestor node.

Next, the ancestor node determination part 11, if one or more of ancestor node candidates exist (YES, at RT05), carries out scoring of the ancestor node lists, and determines one ancestor node where the score becomes the maximum (RT03).

In this scoring, to an ancestor node which is a higher ancestor node, and in which a data length is likely to become small, a high score is given.

Here, as an example of specific scoring, AncScore is made to be defined. The score AncScore corresponding to the ancestor node Y of the node X is calculated by the following equation.

$$AncScore(Y,X) = \alpha \times dis(X,Y) + \beta \times 1/entopy(freq(Y), freq(X))$$

Here, α and β are constants, and mean a degree where a search speed is considered to be important and a degree where a data amount is considered to be important, respectively.

In addition, dis(X,Y) means the number of edges followed for reaching the node X from the node Y. That is, the larger dis(X,Y) becomes, the higher ancestor node can be selected, and a cost at the time of searching decreases.

The ancestor node determination part 11 takes out from among each ancestor node candidate the node Y where a score AncScore(Y,X) becomes the maximum, and inserts a pair of the node X and the ancestor node Y into the ancestor node storage part 12.

On the other hand, the ancestor node determination part 11, in the case where there is no ancestor node candidate (NO, at RT05), assuming that an ancestor node does not exist, stores the node X and φ in the ancestor node storage part 12 (RT04).

Besides, here, in the case where the information such as data distribution and All are acquired, a method to select an ancestor efficiently by calculating a data amount has been used.

However, in the case where a data distribution and All are not acquired, such a method to select only one parent node with respect to each node may be used.

In addition, here, an ancestor node is selected on the basis of a search speed and data amount, and however, in the case where user's inquiry frequency with respect to each node is known, it may be replaced by another criterion such that an ancestor node of which inquiry frequency is high is made to be selected, or another criterion may be added.

[Data Registration Processing]

Next, the data registration processing will be described.

Figure 10:
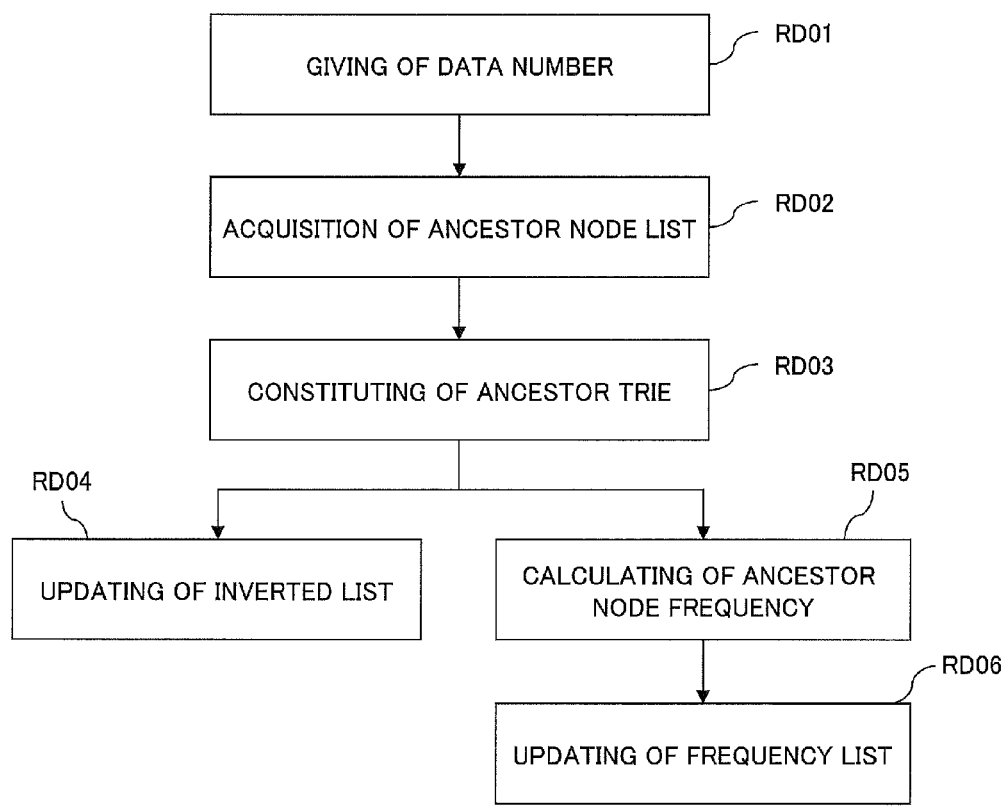
FIG. 10 is a flow chart showing an operation procedure in the case where the information-processing device according to the first embodiment of the present invention performs the data registration processing.

FIG. 10 is a flow chart showing an operation procedure in the case where the information-processing device according to the first embodiment of the present invention performs the data registration processing.

With reference to FIG. 10, the information-processing device 201, when data having one or more tags and frequencies of these tags are inputted into the identifier giving part 14, starts the data registration processing.

First, the identifier giving part 14 has a counter in the inside thereof, and adds 1 to the counter every time data are inputted, and gives the value to the data as an identifier (RD01). Then, the identifier giving part 14 outputs the identifier, one or more tags and a frequency of each tag to the ancestor number converting part 15.

The ancestor number converting part 15 performs the following work with respect to each tag received from the identifier giving part 14. That is, the ancestor number converting part 15, first, gives a tag X to the ancestor node search part 13, and takes out a set of ancestor nodes of the tag X from the ancestor node search part 13 (RD02).

Figure 11:
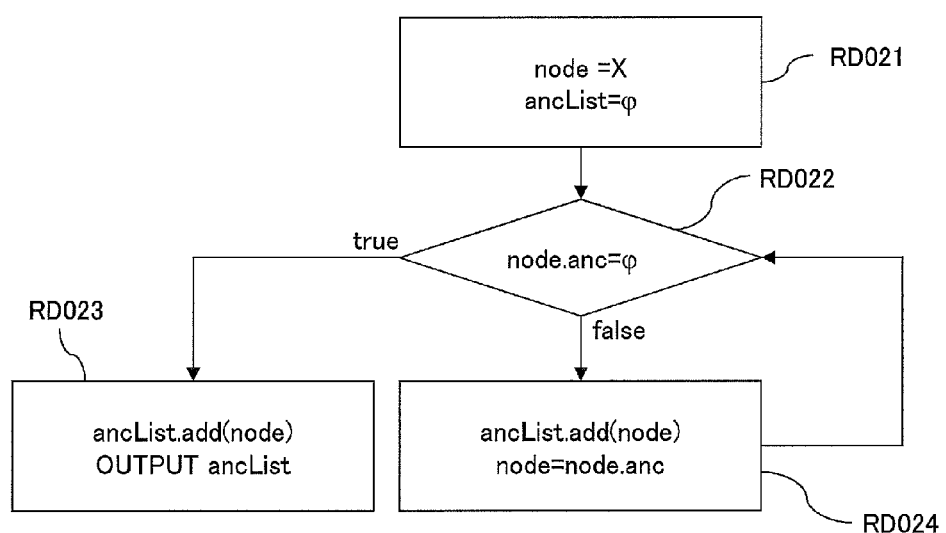
FIG. 11 is a flow chart showing an operation procedure in the case where the ancestor node search part performs calculation processing of an ancestor node set.

FIG. 11 is a flow chart showing an operation procedure in the case where the ancestor node search part performs calculation processing of an ancestor node set.

With reference to FIG. 11, the ancestor node search part 13, first, substitutes the tag X for temporary variable Node, and initializes an output list ancList in a state of empty (RD021).

Next, the ancestor node search part 13 takes out an ancestor node of Node with reference to the ancestor node storage part 12, and makes it as Node.anc.

Next, the ancestor node search part 13, in the case where Node.anc=φ is false (false, at RD022), adds Node to ancList, and substitutes an ancestor node of Node for Node (RD024), and performs determination processing of Node.anc again (RD022).

On the other hand, the ancestor node search part 13, in the case where Node.anc=φ (true, at RD022), adds Node to ancList, and outputs ancList (RD023).

By the above processing, the ancestor node search part 13 can take out specified tags and all the ancestor nodes which exist in a higher order of this tag.

Figure 32:
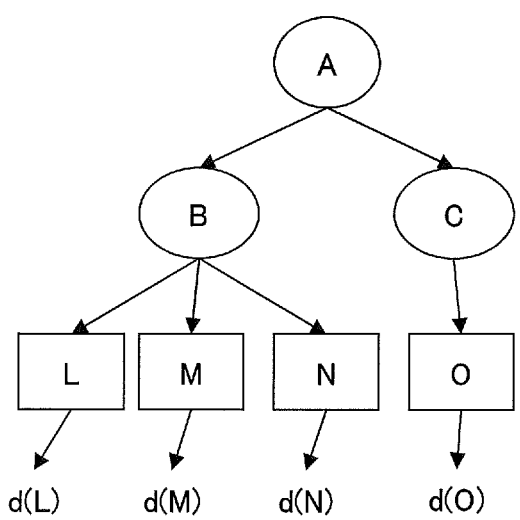
FIG. 32 is a figure showing conceptually an example of a taxonomy and search subject data in the index creation device and data search device according to the first embodiment of the present invention.

For example, in the case where a tag L of the taxonomy indicated in FIG. 32 is given as an input, and information indicated in FIG. 6 is kept in the ancestor node storage part 12, the ancestor node search part 13 returns three nodes that are {L, B, A} to the ancestor number converting part 15.

With reference to FIG. 10 again, next, the ancestor number converting part 15 searches all of the ancestor node list of each tag, and constitutes a trie tree in which common ancestor nodes are brought together, i.e., the above-mentioned trie structure (RD03).

Figure 12:
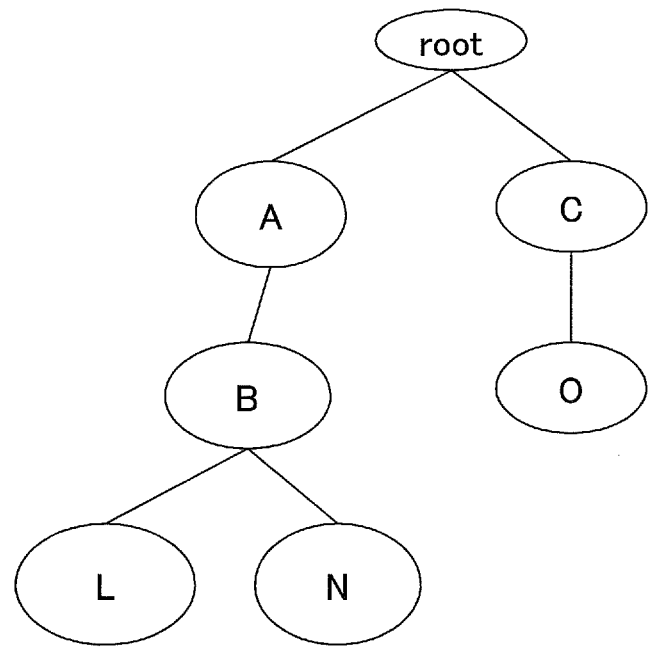
FIG. 12 is a figure showing an example of a trie tree constituted by the ancestor number converting part.

FIG. 12 is a figure showing an example of a trie tree constituted by the ancestor number converting part.

With reference to FIG. 12, this trie tree is a trie tree in which ancestor node lists {L,B,A}, {N,B,A}, and {O, C} which corresponds to three tags L, N, and O, respectively are brought together.

An element of this trie tree is a label of each ancestor node, and has a form in which common ancestors within three ancestor node lists are brought together.

In order to describe a constitution algorithm of this trie tree, a recursive function insertTrie is made to be defined.

Figure 13:
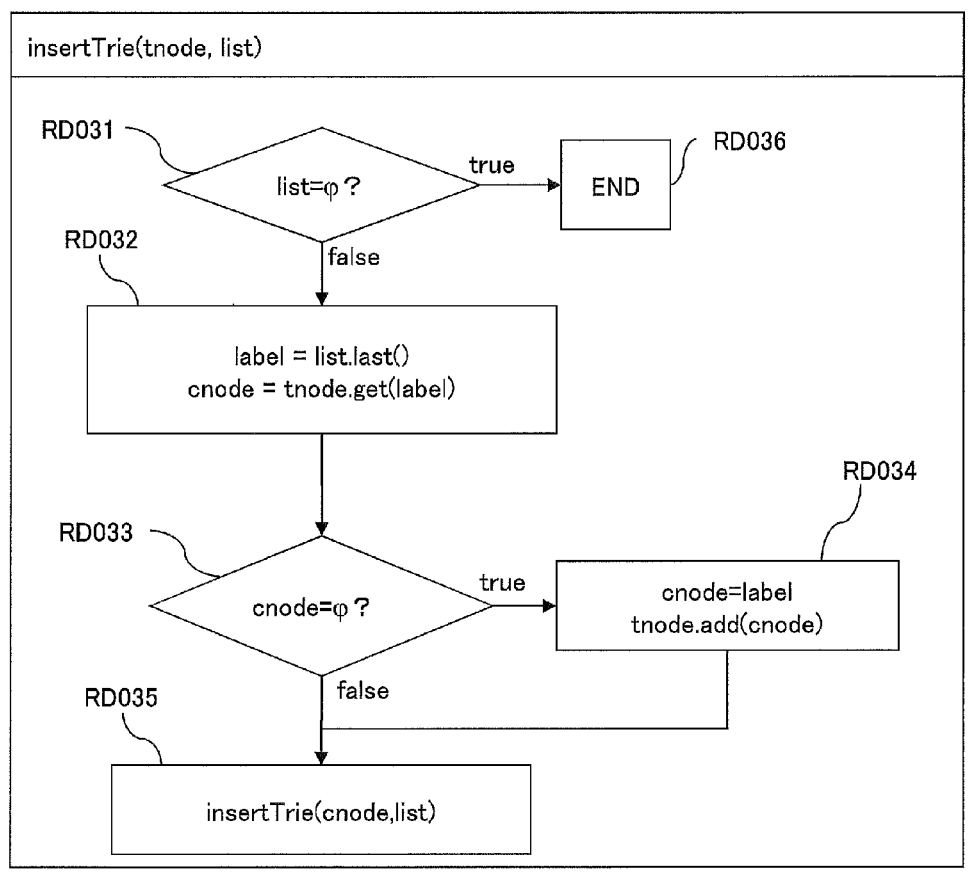
FIG. 13 is a flow chart showing a processing procedure of a recursive function insertTrie.

FIG. 13 is a flow chart showing a processing procedure of a recursive function insertTrie.

With reference to FIG. 13, in the recursive function insertTrie, an element Tnode within a trie tree and one ancestor node list List are made to be inputted, and processing is started.

In insertTrie, first, content of given List is searched (RD031), and if List is empty (true, at RD031), processing is finished without anything is done (RD036).

On the other hand, if the content of List is not empty (false, at RD031), the last label of List is taken out, and among child elements of the element Tnode within the trie tree, a child element Cnode having this label is taken out (RD032).

Next, if the child element Cnode having a label exists (false, at RD033), using Cnode and List as arguments, the same processing as processing shown in RD031 to RD034 is performed (RD035).

On the other hand, if a child element having a label does not exist (true, at RD033), Cnode with this label as a element is created, and Cnode is added as a child element of the element Tnode (RD034), and using Cnode and List as arguments, the same processing as the processing shown in RD031 to RD034 is performed (RD035).

Figure 14:
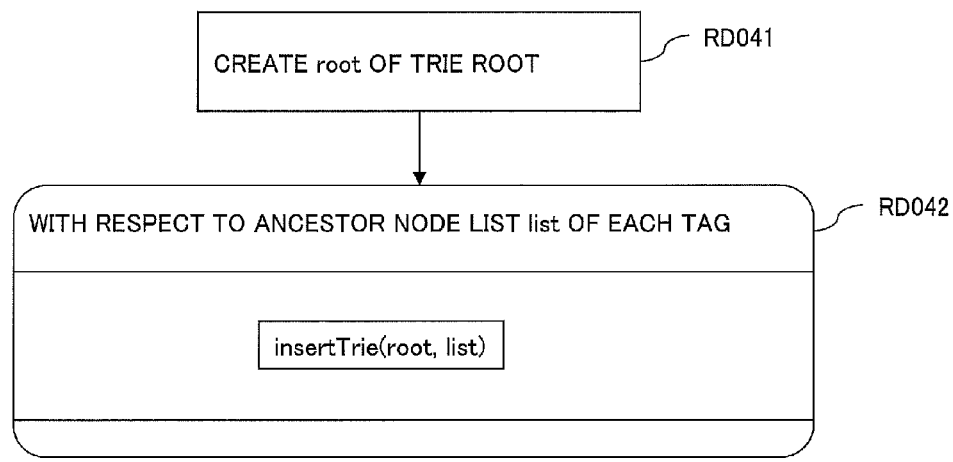
FIG. 14 is a flow chart showing an operation procedure in the case where the ancestor number converting part performs constitution processing of a trie tree.

FIG. 14 is a flow chart showing an operation procedure in the case where the ancestor number converting part performs constitution processing of a trie tree.

With reference to FIG. 14, the ancestor number converting part 15, first, creates a root element Root of the trie tree (RD041).

Next, the ancestor number converting part 15, with respect to a root element Root and each tag's ancestor node list List calls the recursive function insertTrie (RD042).

By the above processing, each ancestor node list is added as a descendant of the root element Root, and the trie tree as indicated in FIG. 12 can be constituted.

With reference to FIG. 10 again, next, the ancestor number converting part 15, based on a trie tree and an identifier, performs update processing of an inverted list within the ancestor number inverted list storage part 16 (RD04).

In order to describe this processing, a recursive function Insert (node Node, int Number) is made to be defined.

Figure 15:
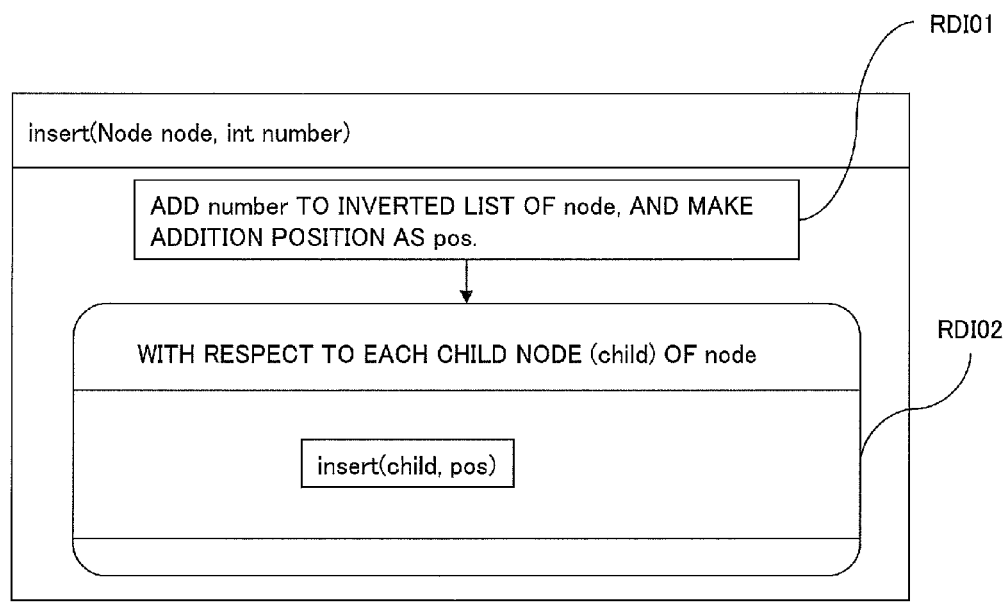
FIG. 15 is a flow chart showing a processing procedure of the recursive function Insert.

FIG. 15 is a flow chart showing a processing procedure of the recursive function Insert.

With reference to FIG. 15, the function Insert has two arguments of Node which means an element in a trie tree, and integer value Number.

In the recursive function Insert, first, with respect to an inverted list within the ancestor number inverted list storage part 16 corresponding to a node specified by Node, Number is added to the last of this inverted list, and the length of the inverted list at the time of being added, i.e., the addition position of Number is taken out to be made to be Pos (RDI01).

Next, with respect to each child node i.e. Child in the trie tree of Node, a function process Insert (Child, Pos) which adds Pos is called. Thereby, to an inverted list of each child element, information Pos of an addition position of a current element specified by Node is added (RDI02).

With reference to FIG. 10 again, the ancestor number converting part 15, with respect to each child element Rchild of Root in a trie tree, calls Insert (Rchild, identifier), and thereby, performs update processing of an inverted list within the ancestor number inverted list storage part 16 (RD04).

In addition, the ancestor number converting part 15, in parallel with the update processing (RD04) of an inverted list, outputs a trie tree, an identifier, and a frequency of each tag to the ancestor frequency converting part 17.

Next, the ancestor frequency converting part 17, based on the trie tree and frequency of each tag which are received from the ancestor number converting part 15, calculates a frequency of an ancestor node (RD05).

Figure 16:
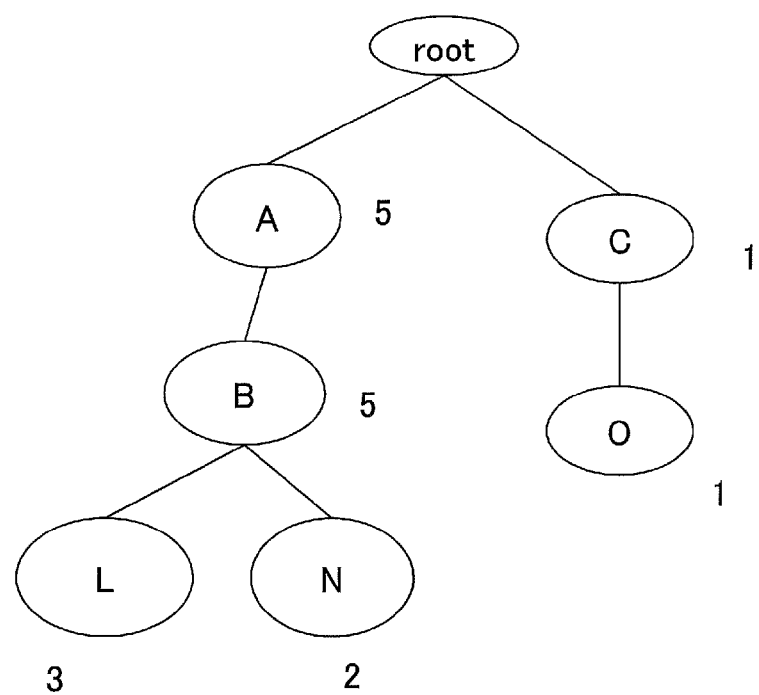
FIG. 16 is a figure showing a result of calculation of a frequency in a trie tree, which the ancestor frequency converting part performs.

FIG. 16 is a figure showing a result of calculation of a frequency in a trie tree, which the ancestor frequency converting part performs.

With reference to FIG. 16, the ancestor frequency converting part 17, while following in the direction of a parent from a leaf node of a trie tree, calculates the sum of a frequency which a child node of each node has, and thereby, calculates a frequency of an ancestor node.

For example, in the case where acquired are a trie tree indicated in FIG. 12 and a frequency 3 of tag L, frequency 2 of tag N, and frequency 1 of tag O, the ancestor frequency converting part 17 calculates a frequency 5 of tag B, frequency 5 of tag A, and frequency 1 of tag C.

With reference to FIG. 10 again, next, the ancestor frequency converting part 17 updates a frequency list (RD06).

In order to describe this processing, a recursive function insertFreq is made to be defined.

Figure 17:
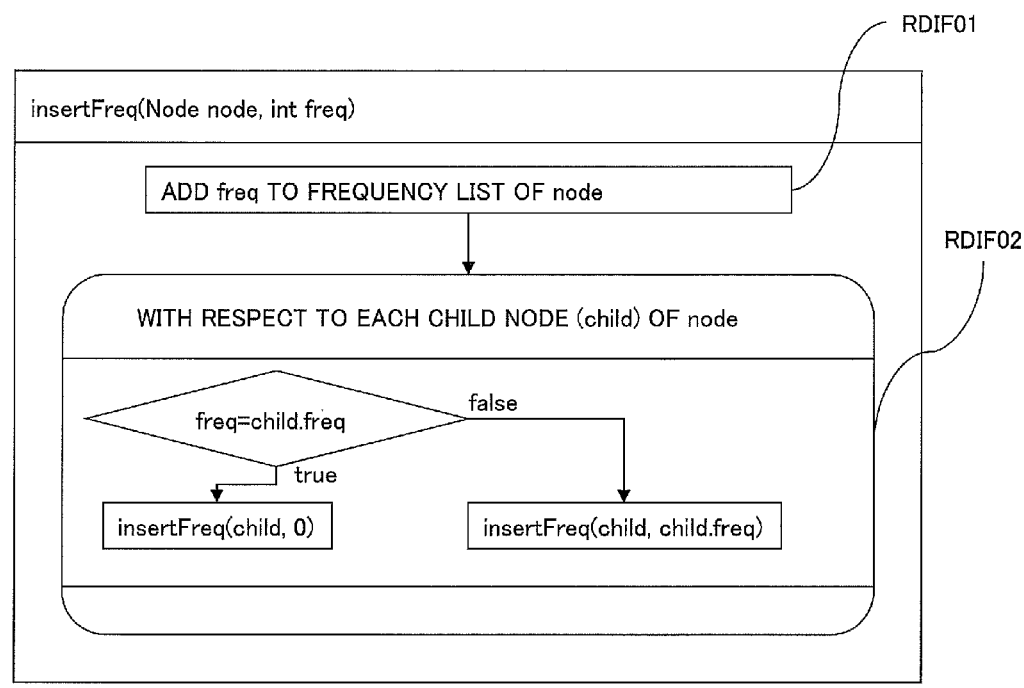
FIG. 17 is a flow chart showing a processing procedure of the recursive function insertFreq.

FIG. 17 is a flow chart showing a processing procedure of the recursive function insertFreq.

With reference to FIG. 17, the recursive function insertFreq has two arguments that are Node which means a node in a trie tree and Freq which is an integer value indicating a frequency.

In the recursive function insertFreq, first, anode specified by Node and a frequency of this node Freq are added to the frequency list storage part 19 (RDIF01).

Furthermore, with respect to each child node Child of Node in the trie tree, a frequency Freq of Node is compared with a frequency Child.freq of a child node, and in the case where it is equal, insertFreq(Child,0) is called, and "0" is added as a frequency.

On the other hand, in the case where a frequency is not equal, by calling insertFreq (Child,Child.freq), a frequency of the child node is added as it is (RDIF02).

The ancestor frequency converting part 17, with respect to each child node Rchild of Root in the trie tree, by calling Insert (Rchild,Rchild.freq), updates a frequency list (RD06).

[Data Search Processing]

Next, data search processing will be described.

Figure 18:
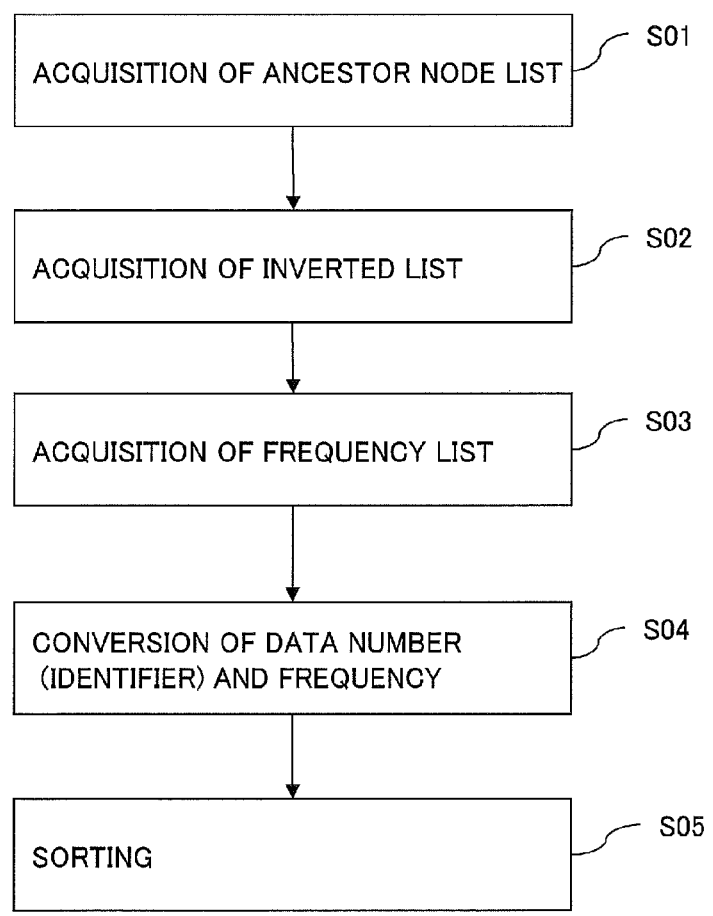
FIG. 18 is a flow chart showing an operation procedure in the case where the information-processing device according to the first embodiment of the present invention performs data search processing.

FIG. 18 is a flow chart showing an operation procedure in the case where the information-processing device according to the first embodiment of the present invention performs data search processing.

With reference to FIG. 18, the information-processing device 201, when a label indicating a node within the taxonomy is inputted into the identifier converting part 18, starts data search processing.

First, the identifier converting part 18, when a label is inputted, using the ancestor node search part 13, acquires an ancestor node list corresponding to a specified node indicated by this label (S01).

Next, the identifier converting part 18, with reference to the ancestor number inverted list storage part 16, reads an inverted list corresponding to the specified node as an integer string (S02).

Next, the identifier converting part 18, with reference to the frequency list storage part 19, reads a frequency list corresponding to the specified node as an integer string (S03).

Next, the identifier converting part 18, based on an ancestor node list, an inverted list, and a frequency list, creates a list of a tuple of an identifier and a frequency. In more details, the identifier converting part 18, with respect to a tuple of each value within an inverted list having a length n and a frequency list, performs processing based on a function Trans (S04).

Figure 19:
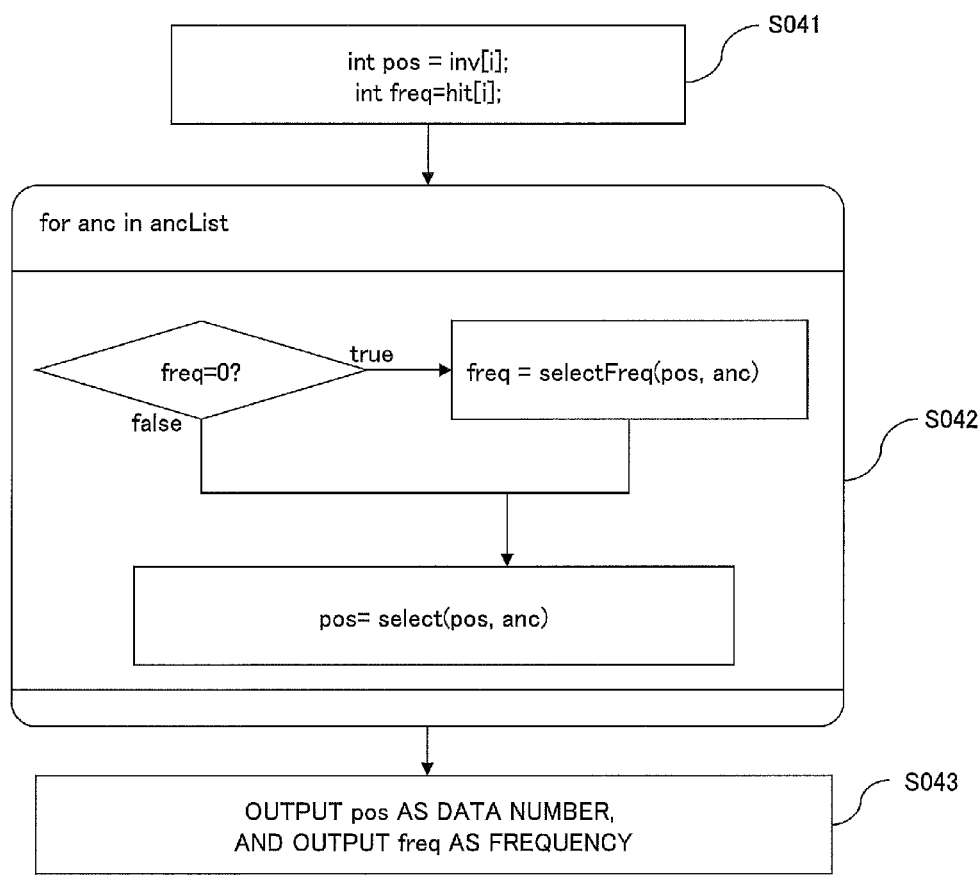
FIG. 19 is a flow chart showing a processing procedure of the function Trans.

FIG. 19 is a flow chart showing a processing procedure of the function Trans. In FIG. 19, indicated is a processing procedure of the function Trans (Inv[i], Hit[i], ancList) which has as arguments an ancestor node list ancList corresponding to a node X, a value within an inverted list Inv[i] (0<i<=n), and a value within a frequency list Hit[i] (0<i<=n).

With reference to FIG. 19, in the function Trans, first, Inv[i] is made to be substituted for a temporary variable Pos, and Hit[i] is made to be substituted for a temporary variable Freq (S041).

Next, ancestor nodes within ancList are made to be referred to sequentially from a lower node, and with respect to each ancestor node Anc, the following processing is made to be performed.

That is, first, in the case where a value of Freq is 0, processing by a function selectFreq (Pos, Anc) is made to be performed.

Here, in the function selectFreq (Pos, Anc), within the frequency list corresponding to the node Anc within the frequency list storage part 19, processing where the Pos-th value is taken out is made to be performed. In the frequency list storage part 19, since a frequency list is stored after being divided into L blocks for example, a frequency can be taken out only by performing decode processing by L times at most. Then, the taken-out value is substituted for a variable Freq.

Next, processing by a function Select (Pos, Anc) is made to be performed. In the function select (Pos, Anc), within the inverted list of the node Anc stored in the ancestor number inverted list storage part 16, processing where the Pos-th value is taken out is made to be performed.

Here, as for the inverted list, since differential compression has been carried out after being divided into blocks for every L pieces as mentioned above, in order to take out the Pos-th value within the inverted list, decoding and addition by L times at most may be performed.

After processing such as this is made to be performed with respect to all the ancestor nodes, Pos as an identifier i.e. a data number and Freq as a frequency are made to be outputted (S043).

With reference to FIG. 10 again, next, the identifier converting part 18 rearrange an identifier in the order of a frequency, and outputs it as a search result (S05).

Besides, in the information processing device according to the first embodiment of the present invention, the identifier converting part 18 is made to be configured to rearrange an identifier in the order of a frequency and output it, and however, the information-processing device 201 may be configured to have a certain evaluation value corresponding to each identifier outside, and to rearrange an identifier based on the frequency and the evaluation value.

Next, an effect achieved by the information-processing device according to the first embodiment of the present invention will be described more specifically.

The information processing device according to the first embodiment of the present invention, in an inverted list corresponding to a node in the taxonomy, without storing a row of identifiers, stores a position, within an inverted list, of an ancestor node that is a higher node of this node. Thereby, an index where a data amount is small, and also searching is performed at high speed has been realized.

First, here, it is assumed that by taxonomy registration processing, the taxonomy indicated in FIG. 32 has been registered and ancestor nodes indicated in FIG. 6 have been registered.

Furthermore, when by data registration processing, data represented by the inverted list shown in FIG. 1 (a) is registered, in the ancestor number inverted list storage part 16, the inverted list shown in FIG. 7 is kept in a form where differential compression has been carried out.

Upon paying attention to the inverted list shown in FIG. 7, in nodes A and C where an ancestor node is φ in the ancestor node list shown in FIG. 6, identifiers corresponding to these nodes have been entered as they are, and however, with respect to the inverted list other than them, as compared with the inverted index shown in FIG. 1 (b), a differential value between each element has been suppressed to be small, and compression in a high rate has been realized.

Next, in order to describe that searching by the information-processing device according to the first embodiment of the present invention is high in a speed thereof, the data search processing will be described.

It is assumed that a label indicating a node B has been inputted into the identifier converting part 18.

At this time, the identifier converting part 18, from among an inverted list shown in FIG. 7 and a frequency list shown in FIG. 8, takes out a row corresponding to d (B), respectively.

In addition, the identifier converting part 18, as an inverted list corresponding to an ancestor node of a node B, takes out a row corresponding to a node A from an inverted list shown in FIG. 7.

In addition, the identifier converting part 18 collates each data of the row corresponding to d (B) with the inverted list of the ancestor node A, and can take out a row of identifiers (1, 23, 456, 12000, 16333) and a row of frequencies (4, 1, 3, 2, 5).

Since the number of steps of the above processing is a fixed multiple with respect to an identifier row length, it is possible to realize data search at high speed.

Furthermore, the identifier converting part 18 can rearrange the taken-out row of identifiers in the order of frequencies such as (16333, 1, 456, 12000, 23), and return in order data associated strongly with the specified nodes.

In addition, by adjusting parameters α, β, and γ in the taxonomy registration processing indicated in FIG. 9, it is possible to change a selection method of an ancestor node.

For example, by configuring γ small, it is considered that an ancestor node corresponding to a node C indicated in FIG. 6 is made to be registered as a node A instead of φ.

At this time, information stored in the ancestor number inverted list storage part 16 will be an inverted list shown in the following FIG. 20.

FIG. 20 is a figure showing an example of an ancestor number inverted list stored in the ancestor number inverted list storage part in the information-processing device according to the first embodiment of the present invention.

With reference to FIG. 20, as for an integer string in this inverted list, with respect to an inverted list shown in FIG. 7, a differential value of each value in an integer string corresponding to the node C has become further small and by carrying out compression of this differential value, a data amount of the inverted list can be made further small.

However, by this configuration, in the case of performing inquiry with respect to the node C, it is necessary to refer to an inverted list of the node A. Consequently, as compared with a case of the inverted list shown in FIG. 7, it takes time in search processing.

In this way, by adjusting $\alpha$, $\beta$, and $\gamma$, it is possible to adjust balance of a data size and a search speed.

As mentioned above, a data structure according to the first embodiment of the present invention, in the taxonomy having a tag with respect to search subject data, is the data structure for taking out a set of search subject data which can be reached from each node in the taxonomy. Then, the data structure is comprised of data for ancestor reference, and data for inverted list i.e. ancestor number inverted lists. This data for ancestor reference, in the taxonomy, indicates an ancestor node that is a higher node of each node. Then, the data for inverted list include an inverted list of each node, and among of each node, an inverted list of a node where the ancestor node is registered in the data for ancestor reference is a list of integer values indicating a position within an inverted list corresponding to a registered ancestor node. Furthermore, in the data for inverted list, a list of integer values in an inverted list of each node is divided into two or more blocks, and a differential value between an integer value and an integer value directly before the integer value in the block has been converted into a bit string of a variable length integer code.

In addition, the index creation device according to the first embodiment of the present invention, in the taxonomy having a tag with respect to search subject data, creates an inverted list used for taking out a set of search subject data which can be reached from each node in the taxonomy. Then, in the index creation device, a list of integer values in an inverted list of each node is divided into two or more blocks, and a differential value between an integer value and an integer value directly before the integer value in the block has been converted into a bit string of a variable length integer code. Then, the ancestor node determination part 11, for every node in the taxonomy, selects one ancestor node that is a higher node of the node and generates data for ancestor reference indicating the selected ancestor node. The ancestor node search part 13, based on the data for ancestor reference, generates an ancestor node list indicating one or more ancestor nodes of a tag in the taxonomy. Then, the ancestor number converting part 15, upon receiving an identifier of search subject data, with respect to the highest node among each node in the ancestor node list, adds the identifier as a element of a corresponding inverted list, and with respect to a node other than the highest node, as a element of a corresponding inverted list, in place of the identifier, adds an integer value indicating a position in an inverted list corresponding to a node that is higher by one than the node.

In addition, the data search device according to the first embodiment of the present invention, in the taxonomy having a tag with respect to search subject data, takes out a set of search subject data which can be reached from a specified node specified in the taxonomy. Then, in the data search device, the ancestor number inverted list storage part 16 stores data for inverted list. This data for inverted list include an inverted list of each node in the taxonomy, and among each node, an inverted list of the highest node is a list of integer values indicating an identifier of search subject data, and an inverted list of a node other than the highest node, in place of the identifier, is a list of integer values indicating a position, in an inverted list corresponding to a node that is higher by one than the node. Furthermore, in the data for inverted list, a list of integer values in an inverted list of each node is divided into two or more blocks, and a differential value between an integer value and an integer value directly before the integer value in the block has been converted into a bit string of a variable length integer code. Then, the identifier converting part 18, upon receiving information indicating the specified node, based on the data for inverted list, processing to take out an integer value of the inverted list corresponding to a higher node of the specified node, which corresponds to the position indicated by an integer value of the inverted list corresponding to the specified node, is made to be repeated until taking out the identifier of the inverted list corresponding to the highest node, and thereby, a list of identifiers of the search subject data corresponding to the specified node is made to be created.

In this way, by representing an inverted list of each node in the taxonomy with a position in an inverted list of an ancestor node, it is possible to shorten a differential value of an integer string in the inverted list. Thereby, by representing this differential value with a variable length integer code, an inverted list having small data length can be created.

Furthermore, at the time of searching, in order to convert an inverted list corresponding to a certain node into a row of identifiers of search subject data, inverted lists corresponding to at most "height of graph (tree structure)" pieces of ancestor nodes may be referred to. This reference processing is usually performed at high speed, and the higher a specified node is, the less processing will be needed.

Specifically, usually, in the case of creating an inverted index with respect to all the nodes, it is necessary to keep a row of identifiers as indicated in FIG. 1 (*b*).

As compared with this, in the data search device according to the first embodiment of the present invention, an inverted index may keep a row of identifiers as indicated in FIG. 7.

Since an identifier row indicated in FIG. 7, as compared with an identifier row indicated in FIG. 1 (*b*), is comprised of small values, this inverted index can be compressed substantially by carrying out processing to take a differential value of these values and compress it with a variable length integer code.

In addition, only by performing at most (an identifier row length×the number of ancestor node×L) times of referring, it becomes possible to perform inquiring with respect to a higher node.

That is, the data search device according to the first embodiment of the present invention, while representing compactly an inverted index corresponding to each node in the taxonomy, can perform at high speed inquiring with respect to a higher node in the taxonomy. In addition, a compact data structure where inquiry with respect to a higher node in the taxonomy is realizable at high speed can be realized.

Consequently, while usage data amount is made to be suppressed compactly, an inquiry with respect to a semantic class that is a higher node in the taxonomy can be realized at high speed.

In this way, among each constituent in the data structure according to the first embodiment of the present invention, based on a minimum configuration comprised of the data for ancestor reference and data for inverted list, it becomes possible to achieve an object of the present invention that a data volume for search processing is made to be reduced and the search processing is made to be performed at high speed.

In addition, among each constituent in the index creation device according to the first embodiment of the present invention, based on a minimum configuration comprised of the ancestor node determination part 11, ancestor node search part 13, and ancestor number converting part 15, it becomes possible to achieve an object of the present invention that a data volume for search processing is made to be reduced and the search processing is made to be performed at high speed.

In addition, among each constituent in the data search device according to the first embodiment of the present invention, based on a minimum configuration comprised of the ancestor number inverted list storage part 16 and identifier converting part 18, it becomes possible to achieve an object of the present invention that a data volume for search processing is made to be reduced and the search processing is made to be performed at high speed.

Besides, although disclosed is a configuration to increase an efficiency of search processing by converting a search word into a tree structure in Patent Document 1, the information-processing device according to the first embodiment of the present invention is made to be configured to compress the whole index by converting an index used for searching into a tree structure, and is one that is completely different from the configuration according to Patent Document 1.

In addition, in the index creation device according to the first embodiment of the present invention, the ancestor node determination part 11, based on a data distribution corresponding to an ancestor node, determines an ancestor node with respect to each node. That is, the ancestor node determination part 11, upon receiving a frequency distribution indicating whether each node in the taxonomy has or may have to what extent of a frequency within a prescribed data set, for every node in the taxonomy, based on a frequency corresponding to each ancestor node of the node, calculates a data length of a corresponding inverted list in the case of having selected the each ancestor node, and among the each ancestor node, selects preferentially the ancestor node having small data length and a higher ancestor node in the taxonomy.

By such a configuration as this, an inverted index can be created while balance of a search speed and data amount is adjusted.

In addition, the data search device according to the first embodiment of the present invention stores not only an inverted list corresponding to each node, but also a frequency list. That is, the frequency list storage part 19 stores the frequency list of each node in the taxonomy, which indicates a frequency corresponding to each of search subject data. Then, the identifier converting part 18, furthermore, in a list of identifiers of one or more search subject data corresponding to a specified node, sorts identifiers based on the frequency list.

By such a configuration as this, it is possible to return a ranking based on a frequency without returning only an identifier as a search result.

In addition, the data structure according to the first embodiment of the present invention, comprises frequency data where in the case of representing a frequency list of a certain node within the taxonomy, a frequency list of this node is compared with a frequency list of an ancestor node of this node, and a short code is given when they have the same frequency.

By such a configuration as this, a frequency list having a small data length can be created.

Next, an other embodiment of the present invention will be described using the figures. It is noted that the same reference character will be is given to the same or corresponding part in the figures, and thus the description will not be repeated.

Second Embodiment

The present embodiment relates to an information-processing device to achieve an increase in efficiency of processing in the case where two or more nodes are specified as compared with the information-processing device according to the first embodiment of the present invention. It is the same as the information-processing device according to the first embodiment except for contents described in the following.

Figure 21:
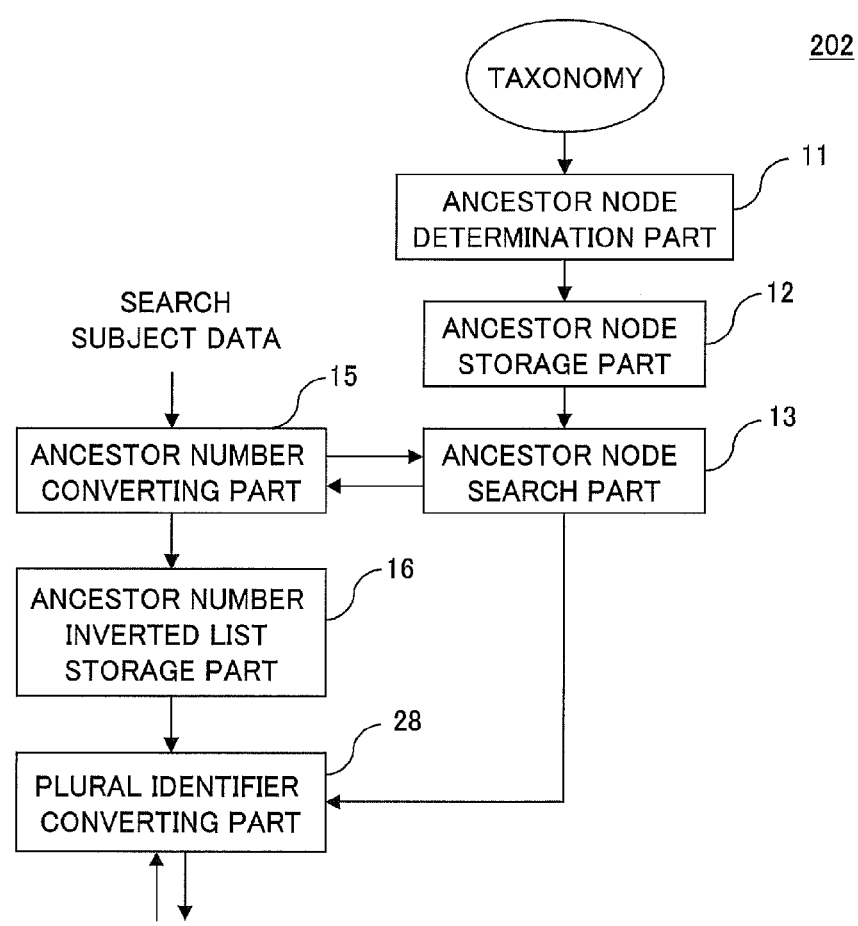
FIG. 21 is a block diagram indicating a control structure provided by the information-processing device according to the second embodiment of the present invention.

FIG. 21 is a block diagram indicating a control structure provided by the information-processing device according to the second embodiment of the present invention.

With reference to FIG. 21, an information-processing device 202, as compared with the information-processing device according to the first embodiment of the present invention, comprises a plural identifier converting part 28 in place of the identifier converting part 18.

The plural identifier converting part 28, upon receiving two or more specified nodes within the taxonomy, for every specified node, takes out an ancestor node list using the ancestor node search part 13. The plural identifier converting part 28, with respect to each specified node, creates a trie tree in which common ancestor nodes are brought together. Then, the plural identifier converting part 28, while carrying out depth first search of the created trie tree, creates a list of identifiers indicating a search subject data set associated with each of all specified nodes.

Figure 22:
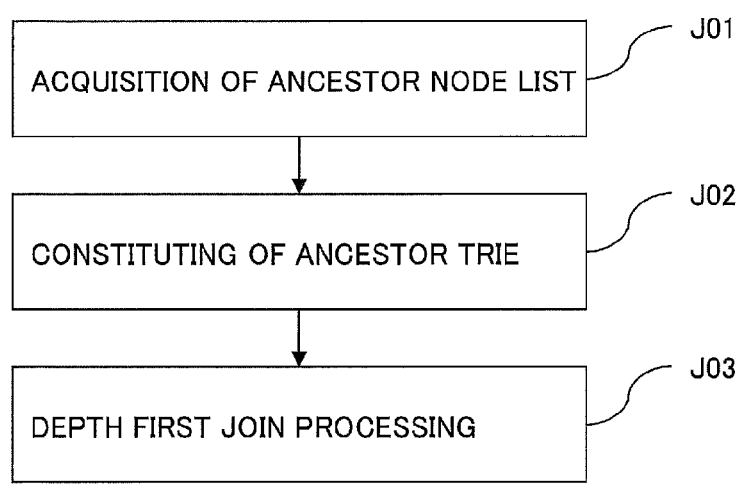
FIG. 22 is a flow chart indicating an operation procedure in the case where the information-processing device according to the second embodiment of the present invention performs data search processing.

FIG. 22 is a flow chart indicating an operation procedure in the case where the information-processing device according to the second embodiment of the present invention performs data search processing.

With reference to FIG. 22, the information-processing device 202, when information indicating two or more nodes within the taxonomy are inputted into the plural identifier converting part 28, starts data search processing.

First, the plural identifier converting part 28, with respect to the inputted one or more specified nodes, acquires each ancestor node list using the ancestor node search part 13 (J01). This processing is the same processing as processing S01 in the first embodiment of the present invention.

Next, the plural identifier converting part 18, among the ancestor node list of each specified node, constitutes a trie tree in which common ancestor nodes are brought together (J02). This processing is the same processing as processing RD03 in the first embodiment of the present invention.

Next, the plural identifier converting part 18, in the constituted trie tree, by repeating JOIN processing while performing depth first search, outputs an acquired result as a search result (J03).

Here, the processing J03 will be described in detail. This processing, in the trie tree, while performing depth first search, carries out two processes: Node-in and Node-out, which are shown in FIG. 23 and FIG. 24.

Here, in the depth first search where the root of a trie tree is made to be a starting point, processing Node-in is the processing carried out in the case of entering a node, and processing Node-out is the processing carried out in the case of exiting a node.

Figure 23:
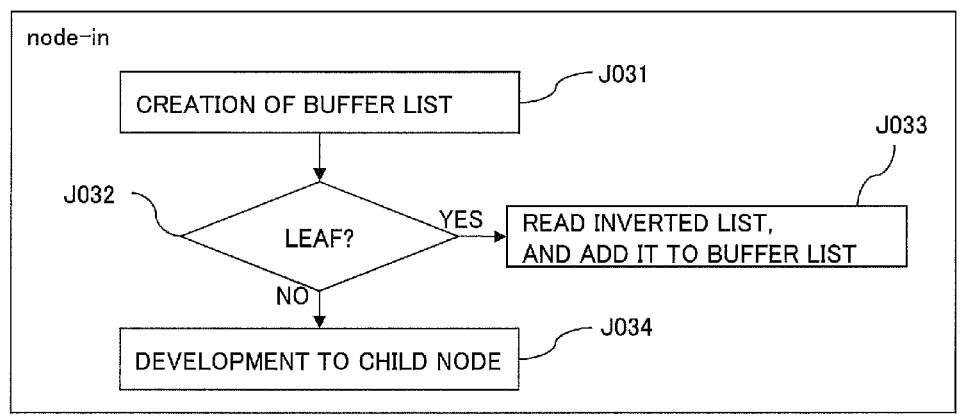
Figure 24:
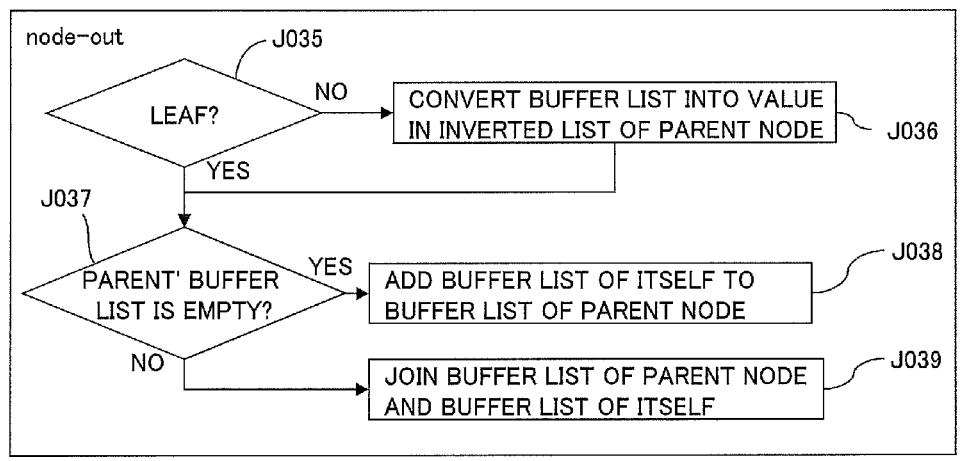
FIG. 24 is a flow chart indicating a procedure of the processing Node-out.

FIG. 23 is a flow chart indicating a procedure of the processing Node-in.

With reference to FIG. 23, the processing Node-in, first, creates a buffer list corresponding to a subject node that is a node entered newly (J031). Here, the buffer list means a list for keeping an integer string temporarily.

Next, in the case where a subject node is a leaf node within a trie tree (YES, at J032), an inverted list corresponding to the subject node is made to be read from the ancestor number inverted list storage part 16, and an integer string of the read inverted list is made to be added to the buffer list of the subject node (J033).

On the other hand, in the case where a subject node is not a leaf node within a trie tree (NO, at J032), search processing is made to be continued with respect to each child node within this trie tree, and the processing will be finished when following all children is completed (J034).

FIG. 24 is a flow chart indicating a procedure of the processing Node-out.

With reference to FIG. 24, the processing Node-out, first, in the case where a subject node to be exited is not a leaf node within a trie tree, based on a buffer list of the subject node and an inverted list corresponding to the subject node, performs processing of conversion of an integer string in the buffer list (J036). This processing is performed by carrying out the above-mentioned function Select (Pos, Node) with respect to a subject node Node and each value Pos in the buffer list.

Next, it is made to be searched whether a buffer list which a parent node of the subject node in a trie tree keeps is empty (J037), and in the case where it is empty (YES, at J037), processing to add the buffer list of the subject node to the buffer list of the parent node is made to be performed (J038).

On the other hand, in the case where it is not empty (NO, at J037), the integer string in the buffer list of the parent node is made to be compared with the integer string in the buffer list of the subject node, and JOIN processing i.e. the processing to make left only an integer value included in both is made to be performed (J039).

Figure 25:
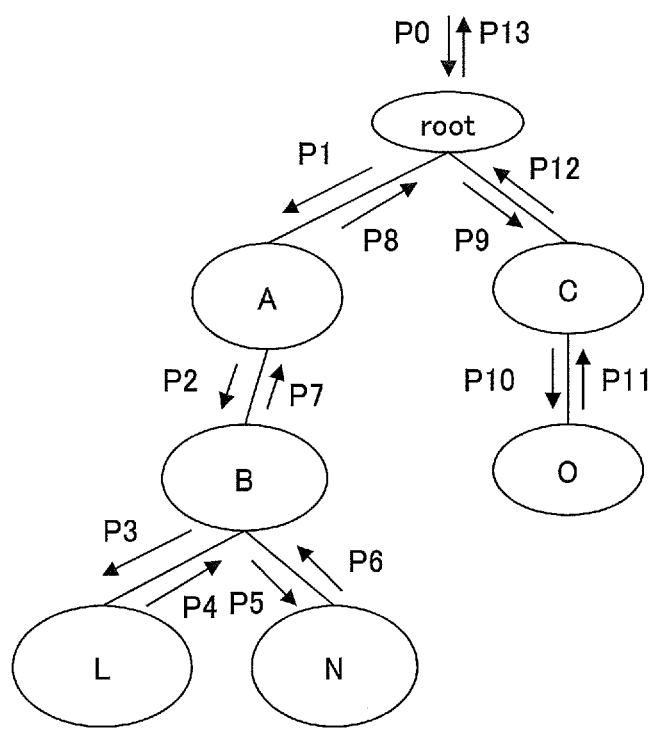
FIG. 25 is a figure showing a specific example of a processing procedure of depth first search in the information-processing device according to the second embodiment of the present invention.

FIG. 25 is a figure showing a specific example of a processing procedure of depth first search in the information-processing device according to the second embodiment of the present invention.

With reference to FIG. 25, with respect to the taxonomy shown in FIG. 32 it is assumed that a situation where three nodes of L, N, and O have been specified as input nodes.

In FIG. 25, a trie tree created from these input nodes is shown, and P0 to P13 indicate a search order with respect to this trie tree.

First, a buffer list of Root is created (P0).

Next, a node A is searched, and a buffer list of the node A is created (P1).

Next, a node B is searched, and a buffer list of the node B is created (P2).

Next, a node L is searched, and an inverted list of the node L is read (P3).

Next, returning to the node B, an inverted list of the node L is added to the buffer list of the node B (P4).

Next, a node N is searched, and an inverted list of the node N is read (P5).

Next, returning to the node B, JOIN processing is carried out on the buffer list of the node B and the inverted list of the node N (P6).

Next, returning to the node A, the buffer list of the node B is converted into a value within the inverted list of the node B, which is added to the buffer list of the node A (P7).

Next, returning to Root, the buffer list of the node A is converted into a value within the inverted list of the node A, which is added to the buffer list of the Root (P8).

Next, a node C is searched, and a buffer list of the node C is created (P9).

Next, a node O is searched, and an inverted list of the node O is read (P10).

Next, returning to the node C, the inverted list of the node O is added to the buffer list of the node C (P11).

Next, returning to Root, the buffer list of the node C is converted into a value within the inverted list of the node C, where JOIN processing is carried out with the buffer list of Root (P12).

Next, the buffer list of Root is outputted (P13).

By the above processing, it is possible to create and output a row of identifiers of search subject data associated with all of the nodes L, N, and O.

As mentioned above, the data search device according to the second embodiment of the present invention, in the case where two or more nodes in the taxonomy are specified, takes out a set of search subject data which can be reached from any of specified nodes. Then, in the data search device, the plural identifier converting part 28, in the case where two or more nodes in the taxonomy are specified, acquires an inverted list corresponding to each specified node from the ancestor number inverted list storage part 16, and in the case of performing processing to take out an integer value of an inverted list corresponding to the higher node of the specified node, which corresponds to a position indicated by an integer value of an inverted list corresponding to the specified node, when among higher nodes common in a tuple of specified nodes, taking out an integer value in an inverted list corresponding to a common ancestor node that is a higher node of the lowest order in the taxonomy, takes out an integer value common in a tuple of the specified nodes. Then, the plural identifier converting part 28, using the taken-out integer values, creates a list of identifiers of search subject data corresponding to two or more specified nodes.

By such a configuration as this, in an AND search using two or more nodes as a key, it becomes possible to perform JOIN operation efficiently.

That is, in the case of performing AND search using the information-processing device according to the first embodiment of the present invention, in order to convert inverted lists corresponding to inputted two or more specified nodes into a row of identifiers, after referring to all of inverted lists of ancestor nodes to which the inverted list of each specified node refers, JOIN Processing is needed to be performed.

For example, in the case where three specified nodes L, N and O are made to be inputted, and the each specified node is associated with 100 search subject data, it is necessary to search positions of inverted lists in all the ancestor nodes each with respect to a total of 300 pieces of integers, and convert them into identifiers.

As compared with this, the information-processing device according to the second embodiment of the present invention, among common ancestor nodes of a tuple of the specified nodes, at the time of having converted a value of the specified node into a number within an inverted list corresponding to the lowest ancestor node, JOIN processing is made to be performed. Thereby, it becomes possible to perform efficient referring.

For example, even in the case where three specified nodes L, N and O are made to be inputted, and each specified node is associated with 100 search subject data, it becomes unnecessary to search positions of inverted lists in all the ancestor nodes.

In order to describe this example specifically, an attention is made to be paid only to JOIN processing of the node L and node N.

As indicated in FIG. 25, JOIN processing of the node L and node N, without converting of each inverted list into identifiers, is made to be carried out with respect to positions within an inverted list corresponding to the node B. Consequently, since processing to refer to an inverted list corresponding to higher nodes than the node B may be performed only with respect to a result of this JOIN processing, it is possible to perform processing efficiently.

Next, an effect which is achieved by an information-processing device according to the second embodiment of the present invention will be described more specifically.

Here, in the case where data indicated in FIG. 6 and FIG. 7 have been kept, it is assumed that a node L and node N are inputted into the plural identifier converting part 28.

At this time, by processing of Step J01 in data search processing indicated in FIG. 22, {L, B, A} is acquired as an ancestor node list corresponding to the node L. In addition, {N, B, A} are acquired as an ancestor node list corresponding to the node N.

Figure 26:
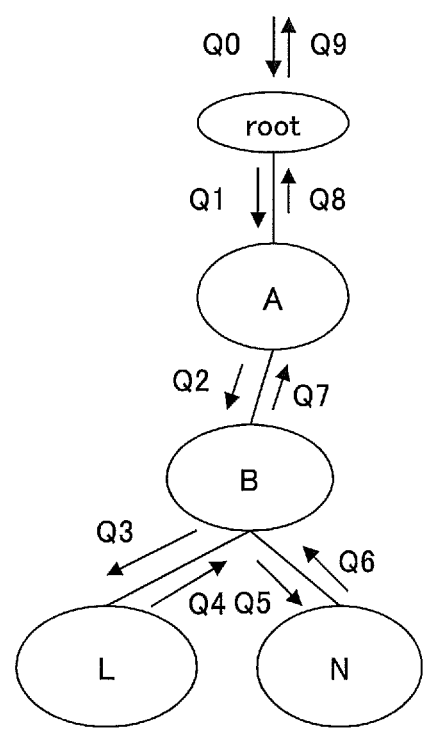
FIG. 26 is a figure showing a specific example of a processing procedure of depth first search in the information-processing device according to the second embodiment of the present invention.

Next, when an ancestor trie is made to be constituted based on these ancestor node lists, an ancestor trie as indicated in FIG. 26 is constituted (J02).

FIG. 26 is a figure showing a specific example of a processing procedure of depth first search in the information-processing device according to the second embodiment of the present invention.

Next, when processing of Step J03 in data search processing indicated in FIG. 22 is made to be performed, JOIN processing is performed with the following processing procedures.

That is, first, a buffer list of Root is created (Q0).

Next, a node A is searched, and a buffer list of the node A is created (Q1).

Next, a node B is searched, and a buffer list of the node B is created (Q2).

Next, a node L is searched, and the inverted list {1, 3, 4} of the node L is read (Q3).

Next, returning to the node B, the inverted list of the node L is added to the buffer list of the node B (Q4).

Next, a node N is searched, and the inverted list {3} of the node N is read (Q5).

Next, returning to the node B, the JOIN processing is carried out on the buffer list of the node B and the inverted list of the node N.

Next, returning to the node A, the buffer list of the node B is converted into a value {3} within the inverted list of the node B, and is added to the buffer list of the node A (Q7).

Next, returning to Root, the buffer list of the node A is converted into a value i.e. an identifier {456} within the inverted list of the node A, and is added to the buffer list of Root (Q8).

Next, the buffer list of Root is outputted (Q9).

In FIG. 26, important points are processing in Steps Q7 and Q9. At Steps Q7 and Q9, referring to inverted lists corresponding to the node B and node A is each performed. This data referring is performed each only with respect to one value. Specifically, at Step Q7, processing to convert 3 into 3 is performed, and at Step Q9, processing to convert 3 into 456 is performed.

As compared with this, in a usual processing procedure, it is necessary to refer to an inverted list of a higher node with respect to each of values within the inverted list {1, 3, 4} corresponding to the node L and the inverted list {3} corresponding to the node N, and the processing will have taken time.

Since other configurations and operations are the same as those of the information processing device according to the first embodiment, detailed descriptions are not repeated here.

Next, an other embodiment of the present invention will be described using the figures. It is noted that the same reference character will be is given to the same or corresponding part in the figures, and thus the description will not be repeated.

Third Embodiment

The present embodiment relates to an information-processing device which acquires a set of nodes associated with a search result as compared with the information-processing device according to the first embodiment of the present invention. It is the same as the information-processing device according to the first embodiment except for contents described in the following.

Figure 27:
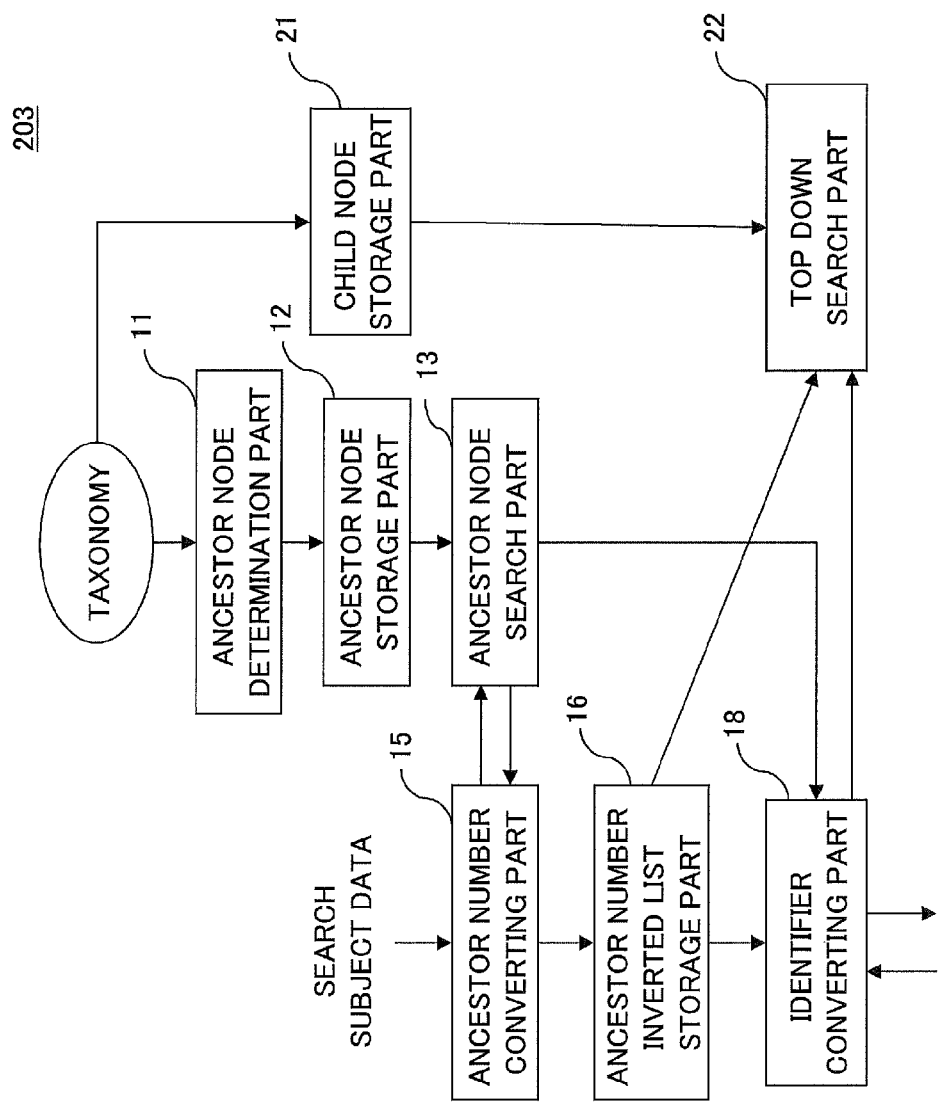
FIG. 27 is a block diagram indicating a control structure provided by the information-processing device according to the third embodiment of the present invention.

FIG. 27 is a block diagram indicating a control structure provided by the information-processing device according to the third embodiment of the present invention.

With reference to FIG. 27, an information-processing device 203, as compared with the information-processing device according to the first embodiment of the present invention, furthermore, is comprised of a child node storage part 21 and a top down search part 22.

The child node storage part 21 stores information indicating a set of child nodes with respect to each node and one virtual Root of each node, which has been created by bringing together ancestor nodes described in the ancestor node storage part 12.

Figure 28:
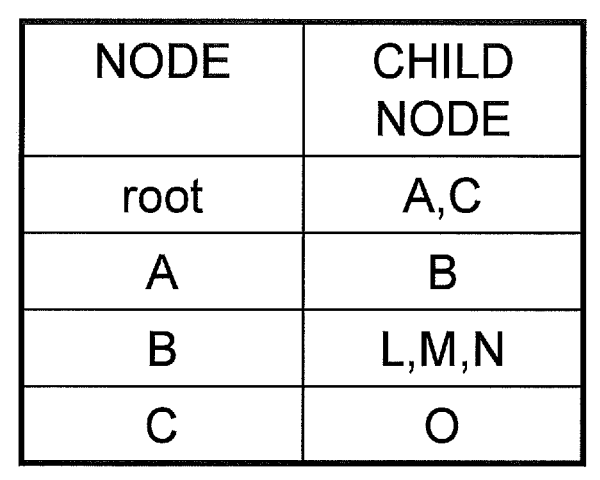

FIG. 28 is a figure showing an example of information stored in the child node storage part 21. FIG. 28 indicates an example of child node information in the case where data for ancestor reference indicated in FIG. 6 is acquired.

With reference to FIG. 28, it turns out that, for example, in the second row, a list of a child node with respect to a node A is registered, and for the node A, a child node that is a node B is registered.

In addition, in the first row, a node A and a node C are registered as child nodes corresponding to a virtual root Root.

In an example indicated in FIG. 6, the node A and node C are registered as the highest node where an ancestor node does not exist. Then, these nodes have a single root Root in higher order virtually, and in a low order of the root Root, assuming that a list of the highest node A and C within the taxonomy exists, the list of child nodes indicated in FIG. 28 are created.

In addition, the top down search part 22, upon receiving a list of identifiers indicating a subset of the specified all search subject data and an integer Min, while referring to inverted lists in the ancestor number inverted list storage part 16, within a set of the specified search subject data, returns a list of nodes which appear no less than Min times.

Next, List processing of the information-processing device according to the third embodiment of the present invention will be described.

The top down search part 22, when a list of identifiers indicating a set of search subject data and an integer value Min are inputted, starts List processing.

In this processing, after search processing is performed in the identifier converting part 18, a list of acquired identifiers and a value of Min configured in advance are called as an input. Besides, these may be called by a user or an outside program.

The top down search part 22, starting from a root node stored in the child node storage part 21, follows nodes within the taxonomy in a top-down manner, and searches whether a frequency within the specified search subject data set is no less than Min. At this time, the top down search part 22 carries out a recursive function List.

Figure 29:
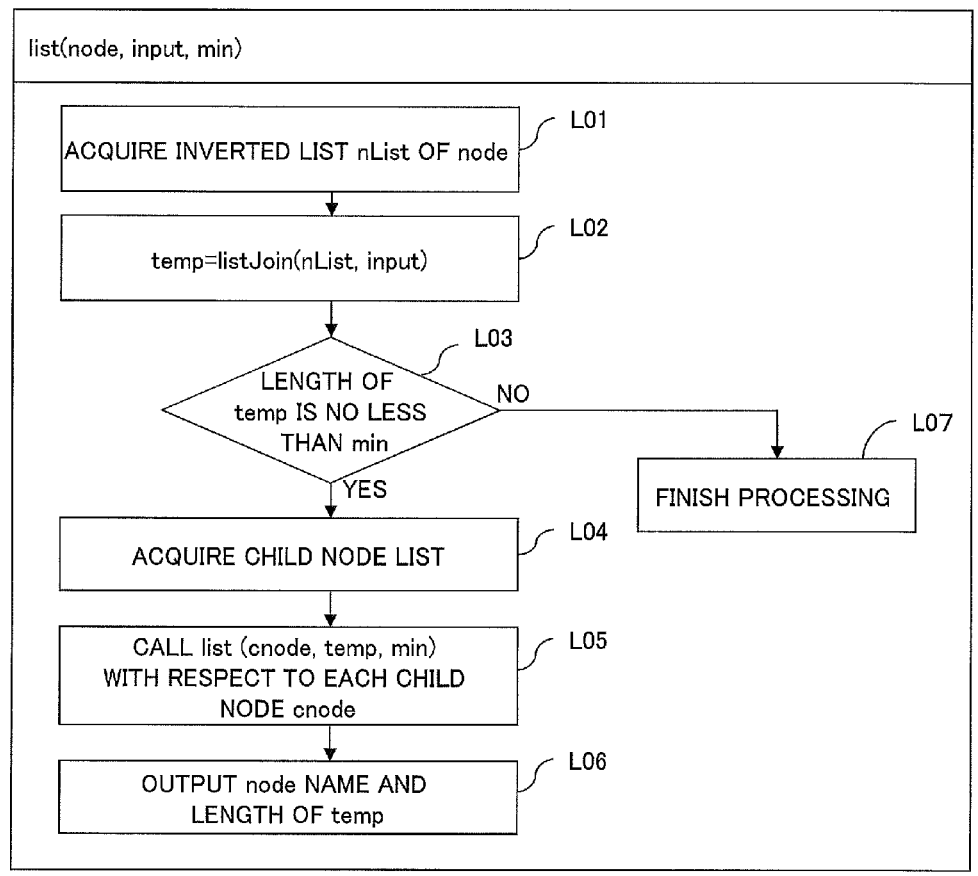
FIG. 29 is a flow chart indicating a processing procedure of the recursive function List.

FIG. 29 is a flow chart indicating a processing procedure of the recursive function List.

With reference to FIG. 29, the recursive function List is called by receiving as an input three values that are Node which indicates a specific node among nodes stored in the child node storage part 21, an integer string Input representing search subject data set, and a threshold value Min.

The recursive function List, upon being called, first, from the ancestor number inverted list storage part 16, reads an inverted list corresponding to a node specified by Node, and makes it as nList (L01).

Next, with respect to nList and an integer string Input, a function listJoin that is JOIN processing is carried out (L02).

Figure 30:
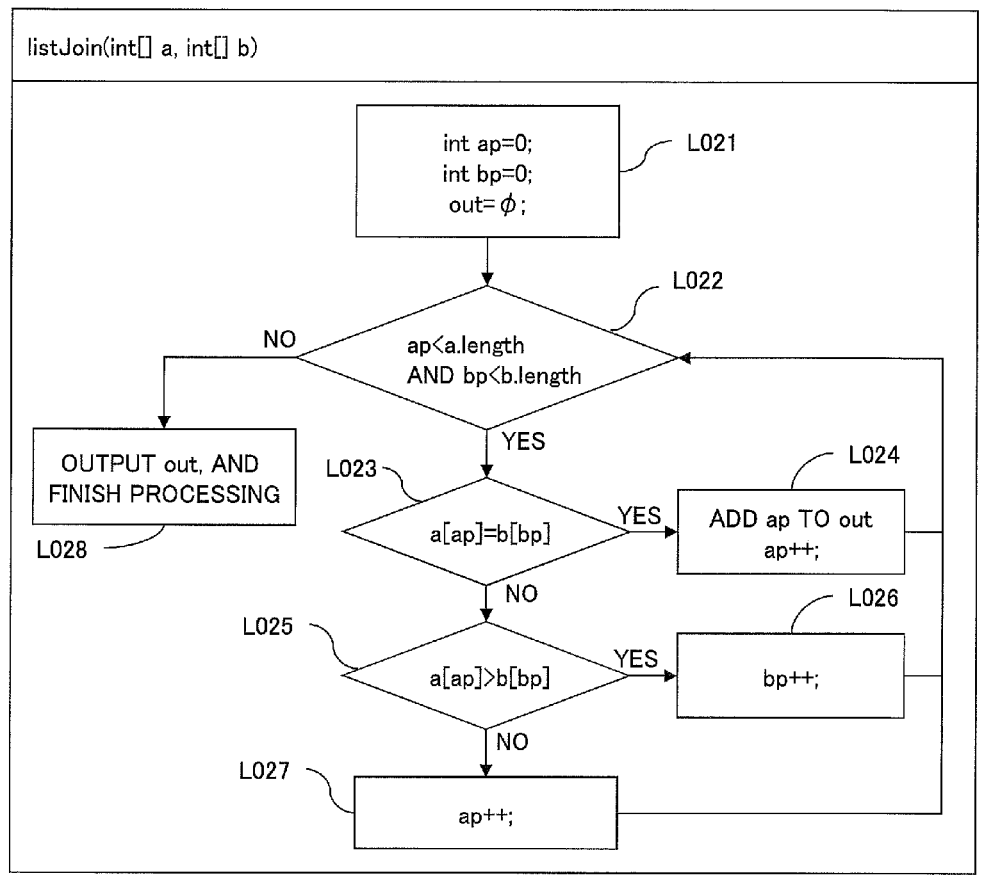
FIG. 30 is a flow chart indicating a processing procedure of the function listJoin.
Figure 31:
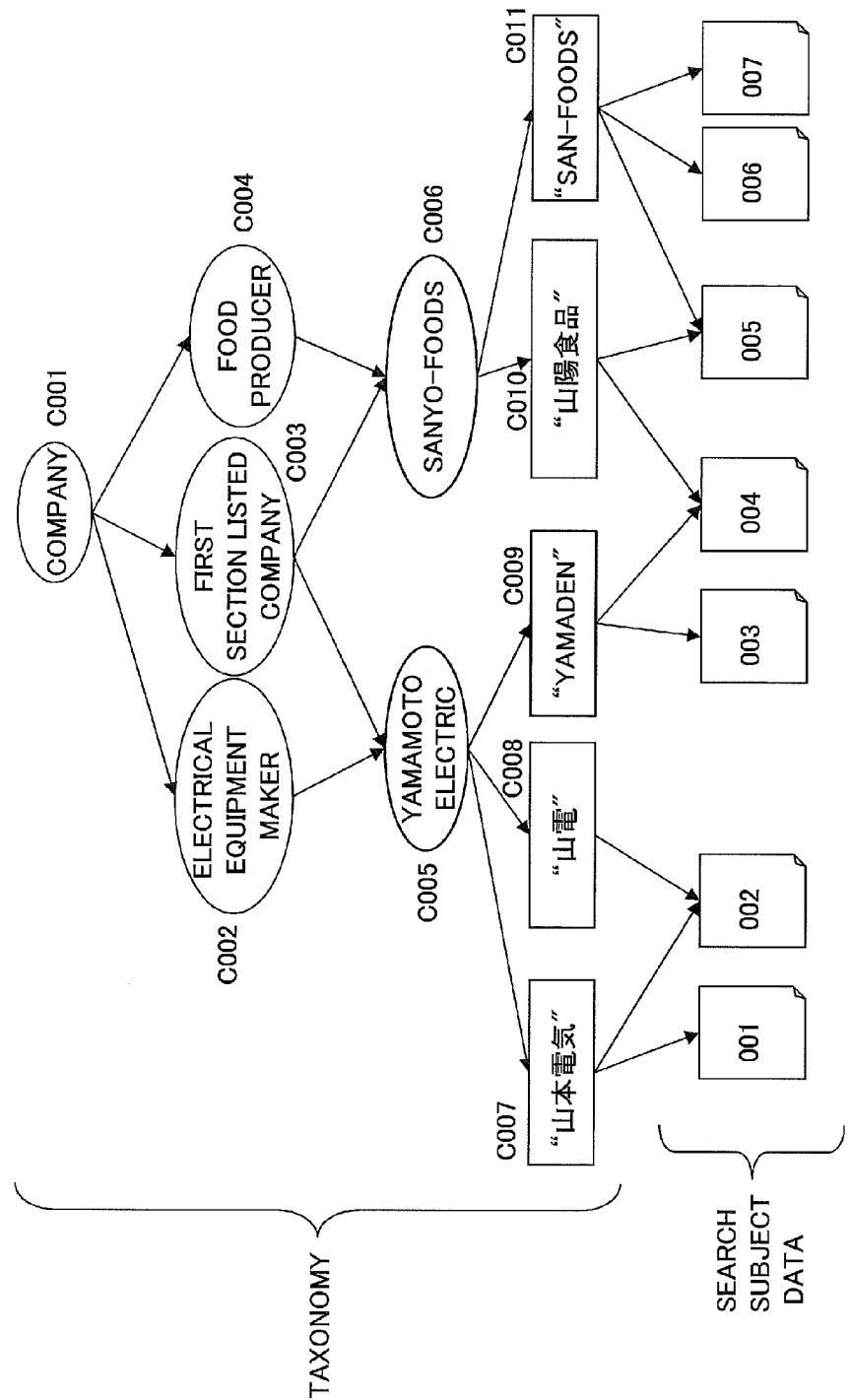
FIG. 31 is a figure showing specifically an example of the taxonomy and search subject data in an index creation device and data search device according to a first embodiment of the present invention.

FIG. 30 is a flow chart indicating a processing procedure of the function listJoin.

With reference to FIG. 30, the listJoin is a function which searches inputted two integer arrays a and b one by one, and returns a list of positions within the integer array a in which numerical values included in both a and b appear.

In more details, if two integer arrays a and b are given, first, a variable ap which indicates a position within the array a is made to be initialized to 0, and a variable by which indicates a position within the array b is made to be initialized to 0, and a variable Out which indicates an integer string to be outputted is made to be initialized in a state of empty (L021).

Next, in the case where ap is smaller than the length of the array a, and bp is smaller than the length of the array bp (YES, at L022), the ap-th of the array a is made to be compared with the bp-th of the array b (L023).

Then, in the case where both are equal (YES, at L023), judging that the same numerical value has been discovered, after adding ap to Out, ap is made to be incremented (L024), and comparison between ap and the length of the array a and comparison between bp and the length of the array bp are made to be performed again (L022).

On the other hand, in the case where both are not equal (NO, at L023) and a value of the ap-th of the array a is larger than a value of the bp-th of the array b (YES, at L025), bp is made to be incremented (L026), and comparison between ap and the length of the array a and comparison between bp and the length of the array bp are made to be performed again (L022).

In addition, in the case where both are not equal (NO, at L023) and a value of the ap-th of the array a is smaller than a value of the bp-th of the array b (NO, at L025), ap is made to be incremented (L027), and comparison between ap and the length of the array a and comparison between bp and the length of the array bp are made to be performed again (L022).

In addition, in the case where ap is no less than the length of the array a, or bp is no less than the length of the array bp (NO, at L022), judging that the last of the array a or b is reached, Out is made to be outputted and processing is finished (L028).

With reference to FIG. 29 again, next, the top down search part 22 makes an integer string acquired as a result of carrying out function listJoin as Temp, and searches the length of Temp (L03).

The top down search part 22, in the case where the length of Temp is no less than Min (YES, L03), determines that a lower node corresponding to a descendant of the node indicated by Node is also to be searched.

The top down search part 22, if determining that a lower node corresponding to a descendant of the node indicated by Node is also to be searched, refers to the child node storage part 21, and acquires a list of child nodes of Node (L04).

Next, the top down search part 22, using as arguments each child node Cnode, an integer string Temp indicating search subject data currently, and Min, calls the same function List (L05). Thereby, the same search is performed also with respect to a descendant node.

Next, the top down search part 22 outputs a label of the node specified by Node, and the length of Temp as a frequency (L06).

On the other hand, the top down search part 22, in the case where the length of Temp is less than Min (NO, at L03), finishes processing.

Besides, the top down search part 22, when starting List processing, using as arguments a root node Root stored in the child node storage part 21, a list of inputted identifiers Dids and a threshold value Min, carries out List (Root,Dids, Min).

Next, List processing of data search device according to the third embodiment of the present invention will be described specifically.

Here, in the case where data for ancestor node reference indicated in FIG. 6, an inverted list indicated in FIG. 7, and child node reference data indicated in FIG. 28 are kept, assumed is the case where {2451,3443} is inputted as a row of identifiers of search subject data, and 1 is inputted as a threshold value Min.

At this time, the top down search part 22 starts processing with respect to child nodes A and C of Root in the child node reference data indicated in FIG. 28.

With respect to the node A, an inverted list indicated in the first row of FIG. 7 is read, and processing by a function listJoin is performed, and {4,5} is acquired as a result of listJoin (d (A), {2451,3443}). The length of {4,5} is 2, and is larger than Min.

Consequently, the top down search part 22, furthermore, performs search processing with respect to the child node B of the node A, and carries out listJoin (d (B), {4,5}).

Since this result become a null set, the top down search part 22 does not perform search processing with respect to a node no higher than the node B, and performs the same processing with respect to another child node C of Root.

That is, the top down search part 22 carries out listJoin (d (C), {2451,3443}), and acquires {1,2} as a result. The length of {1,2} is 2, and is larger than Min.

Consequently, the top down search part 22 carries out listJoin (d (O), {1, 2}) with respect to a child node O of the node C, and acquires {1}.

By such search processing as mentioned above, the top down search part 22, in a set of specified search subject data, outputs information that a frequency of the node A is 2, and a frequency of the node O is 1, and a frequency of the node C is 2.

As mentioned above, in the data search device according to the third embodiment of the present invention, the child node storage part 21 stores child node information indicating a set of child nodes that are a lower node of each node in the taxonomy. The top down search part 22, upon receiving a list of identifiers of search subject data corresponding to a specified node, from among each node in the taxonomy, takes out a node which has a frequency no less than a prescribed value in a set of search subject data indicated by the list. Then, the top down search part 22 detects a position of identifiers in the inverted list corresponding to the highest node, and based on child node information, compares a detected position with integer values in an inverted list corresponding to a node that is lower by one than the highest node, and based on an accordant integer value at least performs processing to calculate a frequency of a node. Furthermore, the top down search part 22, with respect to a lower node of a node, compares an integer values corresponding to a position of identifiers in an inverted list corresponding to a higher node with an integer value in an inverted list corresponding to a node that is lower by one than the higher node, and based on an accordant integer value, performs processing to calculate a frequency of the node that is lower by one than the higher node by 0 times or more. Thereby, the top down search part 22 calculates a frequency of each node in search subject data.

By such a configuration as this, it is possible to search for a high frequency node efficiently in a specified search subject data set.

Processing to search for a high frequency node in a search subject data set is useful for a query extension and a facet search or the like.

For example, by performing List processing like this with respect to a set of a search result acquired by performing a certain search, a set of nodes associated with the search result can be acquired. Consequently, it becomes possible to perform the query extension using a set of these nodes and present the set of these nodes as a facet.

Usually, in order to acquire a set of nodes associated with a search result, it is necessary to be going to perform JOIN processing after reading an inverted list corresponding to each node in the taxonomy from the ancestor number inverted list storage part 16, and referring to an ancestor node with respect to each inverted list, and converting it into a row of identifiers. In such a method as this, it takes time because needlessness increases. As compared with this, in the data search device according to the third embodiment of the present invention, while nodes within the taxonomy is made to be searched in a top-down manner, the JOIN processing can be performed without carrying out converting into a row of identifiers in each node each time, and therefore, a processing efficiency can be enhanced.

Since other configurations and operations are the same as those of the information processing device according to the first embodiment, detailed descriptions are not repeated here.

A part or all of the above-mentioned embodiments are described also as the following additional statements, and however, the scope of the present invention is not limited to the following additional statements.

[Additional Statement 1]

In a taxonomy having a tag with respect to search subject data, a data structure configured to take out a set of search subject data which can be reached from each node in said taxonomy comprising:

data for ancestor reference indicating an ancestor node that is a higher node of said each node in said taxonomy; and data for an inverted list where an inverted list of said each node is included, and among said each node, an inverted list of a node where said ancestor node is registered in said data for ancestor reference is a list of integer values indicating a position within an inverted list corresponding to registered said ancestor node, and furthermore, a list of integer values in an inverted list of said each node is divided into two or more blocks, and a differential value between an integer value and an integer value directly before said integer value in said block is converted into a bit string of a variable length integer code.

[Additional Statement 2]

In a taxonomy having a tag with respect to search subject data, an index creation device configured to create an inverted list used for taking out a set of search subject data which can be reached from each node in said taxonomy, wherein a list of integer values in an inverted list of said each node is divided into two or more blocks, and a differential value between an integer value and an integer value directly before said integer value in said block is converted into a bit string of a variable length integer code, and said index creation device comprises:

an ancestor node determination part configured to select one ancestor node that is a higher node of said node for every node in said taxonomy, and generate data for ancestor reference indicating selected said ancestor node;

an ancestor node search part configured to generate an ancestor node list indicating one or more ancestor nodes of a tag in said taxonomy based on said data for ancestor reference; and an ancestor number converting part configured to, upon receiving an identifier of search subject data, with respect to the highest node among each said node in said ancestor node list, adds said identifier as a element of a corresponding inverted list, and with respect to a node other than said highest node, as a element of a corresponding inverted list, in place of said identifier, adds an integer value indicating a position in an inverted list corresponding to a node that is higher by one than said node.

[Additional Statement 3]

The index creation device according to Additional statement 2, wherein said ancestor node determination part, upon receiving a frequency distribution indicating whether each node in said taxonomy has or may have to what extent of a frequency within a prescribed data set, for every node in said taxonomy, based on a frequency corresponding to each ancestor node of said node, calculates a data length of a corresponding inverted list in the case of selecting said each ancestor node, and among said each ancestor node, selects preferentially said ancestor node where said data length is small and said ancestor node of a higher order in said taxonomy.

[Additional Statement 4]

In a taxonomy having a tag with respect to search subject data, a data search device configured to take out a set of search subject data which can be reached from a specified node specified in said taxonomy comprising:

an ancestor number inverted list storage part configured to store data for an inverted list where an inverted list of each node in said taxonomy is included, and among said each node, an inverted list of the highest node is a list of integer values indicating an identifier of said search subject data, and an inverted list of a node other than said highest node, in place of said identifier, is a list of integer values indicating a position in an inverted list corresponding to a node that is higher by one than said node, and furthermore, a list of integer values in an inverted list of said each node is divided into two or more blocks, and a differential value between an integer value and an integer value directly before said integer value in said block is converted into a bit string of a variable length integer code; and an identifier converting part configured to, upon receiving information indicating said specified node, based on said data for an inverted list, create a list of identifiers of said search subject data corresponding to said specified node by repeating processing to take out an integer value of said inverted list corresponding to a higher node of said specified node, which corresponds to said position indicated by an integer value of said inverted list corresponding to said specified node until taking out said identifier of said inverted list corresponding to said highest node.

[Additional Statement 5]

The data search device according to Additional statement 4, wherein said data search device further comprises a frequency list storage part configured to store a frequency list indicating a frequency, of each node in said taxonomy, corresponding to each of search subject data, and said identifier converting part, further, in a list of identifiers of one or more said search subject data corresponding to said specified node, sorts said identifiers based on said frequency list.

[Additional Statement 6]

The data search device according to Additional statement 4, wherein said data search device, in the case where two or more nodes in said taxonomy are specified, takes out a set of search subject data which can be reached from any of said specified nodes, and said identifier converting part, in the case where two or more nodes in said taxonomy are specified, acquires said inverted list corresponding to each said specified node from said ancestor number inverted list storage part, and in the case of performing processing to take out an integer value of said inverted list corresponding to a higher node of said specified node, which corresponds to said position indicated by an integer value of said inverted list corresponding to said specified node, when among said higher nodes common in a tuple of said specified nodes, taking out an integer value in said inverted list corresponding to a common ancestor node that is a higher node of the lowest order in said taxonomy, takes out said integer value common in a tuple of said specified nodes, and using taken-out said integer value, creates a list of identifiers of said search subject data corresponding to said two or more specified nodes.

[Additional Statement 7]

The data search device according to Additional statement 4, further comprising:

a child node storage part configured to store child node information indicating a set of a child node that is a lower node of each node in said taxonomy; and a top down search part configured to, upon receiving a list of identifiers of said search subject data corresponding to said specified nodes, from among each node in said taxonomy, take out a node which has a frequency no less than a prescribed value in a set of said search subject data indicated by said list, wherein said top down search part detects a position of said identifier in said inverted list corresponding to said highest node, and based on said child node information, compares detected said position with an integer value in said inverted list corresponding to a node that is lower by one than said highest node, and at least performs processing to calculate a frequency of said node based on an accordant integer value, and furthermore, with respect to a lower node of said node, compares an integer value corresponding to a position of said identifier in said inverted list corresponding to a higher node with an integer value in said inverted list corresponding to a node that is lower by one than said higher node, and based on an accordant integer value performs processing to calculate a frequency of said node that is lower by one by 0 times or more, and thereby, calculates a frequency of said each node in said search subject data.

[Additional Statement 8]

In a taxonomy having a tag with respect to search subject data, an index creation method configured to create an inverted list used for taking out a set of search subject data which can be reached from each node in said taxonomy, wherein a list of integer values in an inverted list of said each node is divided into two or more blocks, and a differential value between an integer value and an integer value directly before said integer value in said block is converted into a bit string of a variable length integer code, and said index creation method comprises:

a step to, for every node in said taxonomy, select one ancestor node that is a higher node of said node, and generate data for ancestor reference indicating selected said ancestor node;

a step to generate an ancestor node list indicating one or more ancestor nodes of a tag in said taxonomy based on said data for ancestor reference; and a step to, upon receiving an identifier of search subject data, with respect to the highest node among each node in said ancestor node list, add said identifier as a element of a corresponding inverted list, and with respect to a node other than the highest node, as a element of a corresponding inverted list, in place of said identifier, add an integer value indicating a position in an inverted list corresponding to anode that is higher by one than said node.

[Additional Statement 9]

The index creation method according to Additional statement 8, wherein in a step to generate said data for ancestor reference, upon receiving a frequency distribution indicating whether each node in said taxonomy has or may have to what extent of a frequency within a prescribed data set, for every node in said taxonomy, based on a frequency corresponding to each ancestor node of said node, a data length of a corresponding inverted list in the case of selecting said each ancestor node is made to be calculated, and among said each ancestor node, said ancestor node where said data length is small and said ancestor node of a higher order in said taxonomy are made to be selected preferentially.

[Additional Statement 10]

In a taxonomy having a tag with respect to search subject data, a data search method configured to take out a set of search subject data which can be reached from a specified node specified in said taxonomy, comprising:

a step to acquire data for an inverted list where an inverted list of each node in said taxonomy is included, and an inverted list of the highest node among said each node is a list of integer values indicating an identifier of said search subject data, and an inverted list of a node other than said highest node, in place of said identifier, is a list of integer values indicating a position in an inverted list corresponding to a node that is higher by one than said node, and furthermore, a list of integer values in an inverted list of said each node is divided into two or more blocks, and a differential value between an integer value and an integer value directly before said integer value in said block is converted into a bit string of a variable length integer code; and a step to, upon receiving information indicating said specified node, based on said data for an inverted list, create a list of identifiers of said search subject data corresponding to said specified node by repeating processing to take out an integer value of said inverted list corresponding to a higher node of said specified node, which corresponds to said position indicated by an integer value of said inverted list corresponding to said specified node until taking out said identifier of said inverted list corresponding to said highest node.

[Additional Statement 11]

The data search method according to Additional statement 10, further comprising:

a step to acquire a frequency list indicating a frequency, of each node in said taxonomy, corresponding to each of search subject data; and a step to, in a list of identifiers of one or more said search subject data corresponding to said specified node, sort said identifiers based on said frequency list.

[Additional Statement 12]

The data search method according to Additional statement 10, wherein said data search method, in the case where two or more nodes in said taxonomy are specified, takes out a set of search subject data which can be reached from any of said specified nodes, and in a step to create a list of said identifiers, in the case where two or more nodes in said taxonomy are specified, acquires said inverted list corresponding to each said specified node, and in the case of performing processing to take out an integer value of said inverted list corresponding to a higher node of said specified node, which corresponds to said position indicated by an integer value of said inverted list corresponding to said specified node, when among said higher nodes common in a tuple of said specified nodes, taking out an integer value in said inverted list corresponding to a common ancestor node that is a higher node of the lowest order in said taxonomy, takes out said integer value common in a tuple of said specified nodes, and using taken-out said integer value, creates a list of identifiers of said search subject data corresponding to said two or more specified nodes.

[Additional Statement 13]

The data search method according to Additional statement 10, further comprising:

a step to acquire child node information indicating a set of a child node that is a lower node of each node in said taxonomy; and a step to, upon receiving a list of identifiers of said search subject data corresponding to said specified nodes, from among each node in said taxonomy, take out a node which has a frequency no less than a prescribed value in a set of said search subject data indicated by said list, wherein in a step to take out said node, positions of said identifier in said inverted list corresponding to said highest node are made to be detected, and based on said child node information, detected said positions are made to be compared with integer values in said inverted list corresponding to a node that is lower by one than said highest node, and processing to calculate a frequency of said node based on accordant integer values is made to be at least performed, and furthermore, with respect to a lower node of said node, integer values corresponding to positions of said identifiers in said inverted list corresponding to a higher node is made to be compared with integer values in said inverted list corresponding to a node that is lower by one than said higher node, and based on accordant integer values, processing to calculate a frequency of said node that is lower by one is made to be performed by 0 times or more, and thereby, a frequency of said each node in said search subject data is made to be calculated.

[Additional Statement 14]

In a taxonomy having a tag with respect to search subject data, a computer-readable recording medium in which recorded is an index creation program to create an inverted list used for taking out a set of search subject data which can be reached from each node in said taxonomy, wherein a list of integer values in an inverted list of said each node is divided into two or more blocks, and a differential value between an integer value and an integer value directly before said integer value in said block is converted into a bit string of a variable length integer code, and said index creation program is a program configured to make a computer execute the steps of:

selecting, for every node in said taxonomy, one ancestor node that is a higher node of said node, and generating data for ancestor reference indicating selected said ancestor node;

generating an ancestor node list indicating one or more ancestor nodes of a tag in said taxonomy based on said data for ancestor reference; and upon receiving an identifier of said search subject data, with respect to the highest node among each said node in said ancestor node list, adding said identifier as a element of a corresponding inverted list, and with respect to a node other than said highest node, as a element of a corresponding inverted list, in place of said identifier, adding an integer value indicating a position in an inverted list corresponding to anode that is higher by one than said node.

[Additional Statement 15]

The computer readable recording medium according to Additional statement 14, wherein in a step of generating said data for ancestor reference, upon receiving a frequency distribution indicating whether each node in said taxonomy has or may have to what extent of a frequency within a prescribed data set, for every node in said taxonomy, based on a frequency corresponding to each ancestor node of said node, a data length of a corresponding inverted list in the case of selecting said each ancestor node is made to be calculated, and among said each ancestor node, said ancestor node where said data length is small and said ancestor node of a higher order in said taxonomy are made to be selected preferentially.

[Additional Statement 16]

In a taxonomy having a tag with respect to search subject data, a computer-readable recording medium in which recorded is data search program to take out a set of search subject data which can be reached from a specified node specified in said taxonomy, said data search program being a program configured to make a computer execute the steps of:

acquiring data for an inverted list where an inverted list of each node in said taxonomy is included, and an inverted list of the highest node among said each node is a list of integer values indicating an identifier of said search subject data, and an inverted list of a node other than said highest node, in place of said identifier, is a list of integer values indicating a position in an inverted list corresponding to a node that is higher by one than said node, and furthermore, a list of integer values in an inverted list of said each node is divided into two or more blocks, and a differential value between an integer value and an integer value directly before said integer value in said block is converted into a bit string of a variable length integer code; and upon receiving information indicating said specified node, based on said data for an inverted list, creating a list of identifiers of said search subject data corresponding to said specified node by repeating processing to take out an integer value of said inverted list corresponding to a higher node of said specified node, which corresponds to said position indicated by an integer value of said inverted list corresponding to said specified node until taking out said identifier of said inverted list corresponding to said highest node.

[Additional Statement 17]

The computer readable recording medium according to any of Additional statement 16, said data search program being a program configured to make a computer further execute the step of:

acquiring a frequency list indicating a frequency, of each node in said taxonomy, corresponding to each of search subject data; and sorting, in a list of identifiers of one or more said search subject data corresponding to said specified node, said identifiers based on said frequency list.

[Additional Statement 18]

The computer readable recording medium according to Additional statement 16, wherein said data search program, in the case where two or more nodes in said taxonomy are specified, takes out a set of search subject data which can be reached from any of said specified nodes, and in a step of creating a list of said identifiers, in the case where two or more nodes in said taxonomy are specified, acquires said inverted list corresponding to each said specified node, and in the case of performing processing to take out an integer value of said inverted list corresponding to a higher node of said specified node, which corresponds to said position indicated by an integer value of said inverted list corresponding to said specified node, when among said higher nodes common in a tuple of said specified nodes, taking out an integer value in said inverted list corresponding to a common ancestor node that is a higher node of the lowest order in said taxonomy, takes out said integer value common in a tuple of said specified nodes, and using taken-out said integer value, creates a list of identifiers of said search subject data corresponding to said two or more specified nodes.

[Additional Statement 19]

The computer readable recording medium according to any of Additional statement 16, said data search program being a program configured to make a computer further execute the step of:

acquiring child node information indicating a set of a child node that is a lower node of each node in said taxonomy; and taking out, upon receiving a list of identifiers of said search subject data corresponding to said specified nodes, from among each node in said taxonomy, a node which has a frequency no less than a prescribed value in a set of said search subject data indicated by said list, wherein in a step of taking out said node, positions of said identifier in said inverted list corresponding to said highest node are made to be detected, and based on said child node information, detected said positions are made to be compared with integer values in said inverted list corresponding to a node that is lower by one than said highest node, and processing to calculate a frequency of said node based on accordant integer values is made to be at least performed, and furthermore, with respect to a lower node of said node, integer values corresponding to positions of said identifiers in said inverted list corresponding to a higher node is made to be compared with integer values in said inverted list corresponding to a node that is lower by one than said higher node, and based on accordant integer values, processing to calculate a frequency of said node that is lower by one is made to be performed by 0 times or more, and thereby, a frequency of said each node in said search subject data is made to be calculated.

Above-mentioned embodiments should be considered to an exemplification at all points, and not restrictive. The scope of the present invention is shown not by descriptions mentioned above but by the scope of the claims, and all modifications within meaning and scope equivalent to the claims are intended to be included therein.

This application claims priority on the basis of Japanese Patent Application No. 2010-232896 applied on Oct. 15, 2010, and takes in here all the disclosures thereof.

INDUSTRIAL APPLICABILITY

According to the present invention, in the case where a large-scale taxonomy and data set are made to be managed, it is possible to provide a search engine capable of searching a data set at high speed. Therefore, the present invention has industrial applicability.

DESCRIPTION OF SYMBOLS

11 Ancestor Node Determination Part
12 Ancestor Node Storage Part
13 Ancestor Node Search Part
14 Identifier Giving Part
15 Ancestor Number Converting Part
16 Ancestor Number Inverted List Storage Part
17 Ancestor Frequency Converting Part
18 Identifier Converting Part
19 Frequency List Storage Part
21 Child Node Storage Part
22 Top Down Search Part
28 Plural Identifier Converting Part
101 Cpu
102 Main Memory
103 Hard Disk
104 Input Interface
105 Display Controller
106 Data Reader/Writer
107 Communication Interface
108 Keyboard
109 Mouse
110 Display
111 Recording Medium
121 Bus
201,202,203 Information-Processing Device

What is claimed is:

1. In a taxonomy having a tag with respect to search subject data, an index creation device configured to create an inverted list used for taking out a set of search subject data which can be reached from each node in said taxonomy, wherein a list of integer values in an inverted list of said each node is divided into two or more blocks, and a differential value between an integer value and an integer value directly before said integer value in said block is converted into a bit string of a variable length integer code, and said index creation device, realized by a computer, comprises:

a processor configured to execute instructions to implement:

an ancestor node determination part configured to select one ancestor node that is a higher node of said node for every node in said taxonomy, and generate data for ancestor reference indicating selected said ancestor node;

an ancestor node search part configured to generate an ancestor node list indicating one or more ancestor nodes of a tag in said taxonomy based on said data for ancestor reference; and an ancestor number converting part configured to, upon receiving an identifier of search subject data, with respect to the highest node among each said node in said ancestor node list, adds said identifier as an element of a corresponding inverted list, and with respect to a node other than said highest node, as an element of a corresponding inverted list, in place of said identifier, adds an integer value indicating a position in an inverted list corresponding to a node that is higher by one than said node, wherein said ancestor node determination part, upon receiving a frequency distribution indicating whether each node in said taxonomy has or may have to what extent of a frequency within a prescribed data set, for every node in said taxonomy, based on a frequency corresponding to each ancestor node of said node, calculates a data length of a corresponding inverted list in the case of selecting said each ancestor node, and among said each ancestor node, selects preferentially said ancestor node where said data length is small and said ancestor node of a higher order in said taxonomy.

2. In a taxonomy having a tag with respect to search subject data, a data search device, realized by a computer, configured to take out a set of search subject data which can be reached from a specified node specified in said taxonomy comprising:

a processor configured to execute instructions to implement:

an ancestor number inverted list storage part configured to store data for an inverted list where an inverted list of each node in said taxonomy is included, and among said each node, an inverted list of the highest node is a list of integer values indicating an identifier of said search subject data, and an inverted list of a node other than said highest node, in place of said identifier, is a list of integer values indicating a position in an inverted list corresponding to a node that is higher by one than said node, and furthermore, a list of integer values in an inverted list of said each node is divided into two or more blocks, and a differential value between an integer value and an integer value directly before said integer value in said block is converted into a bit string of a variable length integer code; and an identifier converting part configured to, upon receiving information indicating said specified node, based on said data for an inverted list, create a list of identifiers of said search subject data corresponding to said specified node by repeating processing to take out an integer value of said inverted list corresponding to a higher node of said specified node, which corresponds to said position indicated by an integer value of said inverted list corresponding to said specified node until taking out said identifier of said inverted list corresponding to said highest node, wherein said data search device, in the case where two or more nodes in said taxonomy are specified, takes out a set of search subject data which can be reached from any of said specified nodes, and said identifier converting part, in the case where two or more nodes in said taxonomy are specified, acquires said inverted list corresponding to each said specified node from said ancestor number inverted list storage part, and in the case of performing processing to take out an integer value of said inverted list corresponding to a higher node of said specified node, which corresponds to said position indicated by an integer value of said inverted list corresponding to said specified node, when among said higher nodes common in a tuple of said specified nodes, taking out an integer value in said inverted list corresponding to a common ancestor node that is a higher node of the lowest order in said taxonomy, takes out said integer value common in a tuple of said specified nodes, and using taken-out said integer value, creates a list of identifiers of said search subject data corresponding to said two or more specified nodes.

3. The data search device according to claim 2, wherein said data search device further comprises a frequency list storage part configured to store a frequency list indicating a frequency, of each node in said taxonomy, corresponding to each of search subject data, and said identifier converting part, further, in a list of identifiers of one or more said search subject data corresponding to said specified node, sorts said identifiers based on said frequency list.

4. The data search device according to claim 2, wherein said processor is further configured to execute instructions to implement:

a child node storage part configured to store child node information indicating a set of a child node that is a lower node of each node in said taxonomy; and a top down search part configured to, upon receiving a list of identifiers of said search subject data corresponding to said specified nodes, from among each node in said taxonomy, take out a node which has a frequency no less than a prescribed value in a set of said search subject data indicated by said list, and wherein said top down search part detects a position of said identifier in said inverted list corresponding to said highest node, and based on said child node information, compares detected said position with an integer value in said inverted list corresponding to a node that is lower by one than said highest node, and at least performs processing to calculate a frequency of said node based on an accordant integer value, and furthermore, with respect to a lower node of said node, compares an integer value corresponding to a position of said identifier in said inverted list corresponding to a higher node with an integer value in said inverted list corresponding to a node that is lower by one than said higher node, and based on an accordant integer value performs processing to calculate a frequency of said node that is lower by one by 0 times or more, and thereby, calculates a frequency of said each node in said search subject data.

5. In a taxonomy having a tag with respect to search subject data, an index creation method configured to create an inverted list used for taking out a set of search subject data which can be reached from each node in said taxonomy, wherein a list of integer values in an inverted list of said each node is divided into two or more blocks, and a differential value between an integer value and an integer value directly before said integer value in said block is converted into a bit string of a variable length integer code, and said index creation method comprises:

for every node in said taxonomy, selecting one ancestor node that is a higher node of said node, and generate data for ancestor reference indicating selected said ancestor node;

generating an ancestor node list indicating one or more ancestor nodes of a tag in said taxonomy based on said data for ancestor reference; and upon receiving an identifier of search subject data, with respect to the highest node among each node in said ancestor node list, adding said identifier as an element of a corresponding inverted list, and with respect to a node other than the highest node, as an element of a corresponding inverted list, in place of said identifier, add an integer value indicating a position in an inverted list corresponding to a node that is higher by one than said node, wherein in generating said data for ancestor reference, upon receiving a frequency distribution indicating whether each node in said taxonomy has or may have to what extent of a frequency within a prescribed data set, for every node in said taxonomy, based on a frequency corresponding to each ancestor node of said node, a data length of a corresponding inverted list in the case of selecting said each ancestor node is made to be calculated, and among said each ancestor node, said ancestor node where said data length is small and said ancestor node of a higher order in said taxonomy are made to be selected preferentially.

6. In a taxonomy having a tag with respect to search subject data, a data search method configured to take out a set of search subject data which can be reached from a specified node specified in said taxonomy, comprising:

acquiring data for an inverted list where an inverted list of each node in said taxonomy is included, and an inverted list of the highest node among said each node is a list of integer values indicating an identifier of said search subject data, and an inverted list of a node other than said highest node, in place of said identifier, is a list of integer values indicating a position in an inverted list corresponding to a node that is higher by one than said node, and furthermore, a list of integer values in an inverted list of said each node is divided into two or more blocks, and a differential value between an integer value and an integer value directly before said integer value in said block is converted into a bit string of a variable length integer code; and upon receiving information indicating said specified node, based on said data for an inverted list, creating a list of identifiers of said search subject data corresponding to said specified node by repeating processing to take out an integer value of said inverted list corresponding to a higher node of said specified node, which corresponds to said position indicated by an integer value of said inverted list corresponding to said specified node until taking out said identifier of said inverted list corresponding to said highest node, wherein said data search method, in the case where two or more nodes in said taxonomy are specified, takes out a set of search subject data which can be reached from any of said specified nodes, and in creating a list of said identifiers, in the case where two or more nodes in said taxonomy are specified, acquiring said inverted list corresponding to each said specified node, and in the case of performing processing to take out an integer value of said inverted list corresponding to a higher node of said specified node, which corresponds to said position indicated by an integer value of said inverted list corresponding to said specified node, when among said higher nodes common in a tuple of said specified nodes, taking out an integer value in said inverted list corresponding to a common ancestor node that is a higher node of the lowest order in said taxonomy, takes out said integer value common in a tuple of said specified nodes, and using taken-out said integer value, creates a list of identifiers of said search subject data corresponding to said two or more specified nodes.

7. The data search method according to claim 6, further comprising:

acquiring a frequency list indicating a frequency, of each node in said taxonomy, corresponding to each of search subject data; and in a list of identifiers of one or more said search subject data corresponding to said specified node, sorting said identifiers based on said frequency list.

8. The data search method according to claim 6, further comprising:

acquiring child node information indicating a set of a child node that is a lower node of each node in said taxonomy; and upon receiving a list of identifiers of said search subject data corresponding to said specified nodes, from among each node in said taxonomy, taking out a node which has a frequency no less than a prescribed value in a set of said search subject data indicated by said list, wherein in taking out said node, positions of said identifier in said inverted list corresponding to said highest node are made to be detected, and based on said child node information, detected said positions are made to be compared with integer values in said inverted list corresponding to a node that is lower by one than said highest node, and processing to calculate a frequency of said node based on accordant integer values is made to be at least performed, and furthermore, with respect to a lower node of said node, integer values corresponding to positions of said identifiers in said inverted list corresponding to a higher node is made to be compared with integer values in said inverted list corresponding to a node that is lower by one than said higher node, and based on accordant integer values, processing to calculate a frequency of said node that is lower by one is made to be performed by 0 times or more, and thereby, a frequency of said each node in said search subject data is made to be calculated.

9. In a taxonomy having a tag with respect to search subject data, a non-transitory computer-readable recording medium in which recorded is an index creation program to create an inverted list used for taking out a set of search subject data which can be reached from each node in said taxonomy,
wherein
a list of integer values in an inverted list of said each node is divided into two or more blocks, and a differential value between an integer value and an integer value directly before said integer value in said block is converted into a bit string of a variable length integer code, and
said index creation program is a program configured to make a computer execute the steps of:
selecting, for every node in said taxonomy, one ancestor node that is a higher node of said node, and generating data for ancestor reference indicating selected said ancestor node;
generating an ancestor node list indicating one or more ancestor nodes of a tag in said taxonomy based on said data for ancestor reference; and
upon receiving an identifier of said search subject data, with respect to the highest node among each said node in said ancestor node list, adding said identifier as a element of a corresponding inverted list, and with respect to a node other than said highest node, as a element of a corresponding inverted list, in place of said identifier, adding an integer value indicating a position in an inverted list corresponding to a node that is higher by one than said node, wherein
in generating said data for ancestor reference, upon receiving a frequency distribution indicating whether each node in said taxonomy has or may have to what extent of a frequency within a prescribed data set, for every node in said taxonomy, based on a frequency corresponding to each ancestor node of said node, a data length of a corresponding inverted list in the case of selecting said each ancestor node is made to be calculated, and among said each ancestor node, said ancestor node where said data length is small and said ancestor node of a higher order in said taxonomy are made to be selected preferentially.

10. In a taxonomy having a tag with respect to search subject data, a non-transitory computer-readable recording medium in which recorded is data search program to take out a set of search subject data which can be reached from a specified node specified in said taxonomy, said data search program being a program configured to make a computer execute the steps of:
acquiring data for an inverted list where an inverted list of each node in said taxonomy is included, and an inverted list of the highest node among said each node is a list of integer values indicating an identifier of said search subject data, and an inverted list of a node other than said highest node, in place of said identifier, is a list of integer values indicating a position in an inverted list corresponding to a node that is higher by one than said node, and furthermore, a list of integer values in an inverted list of said each node is divided into two or more blocks, and a differential value between an integer value and an integer value directly before said integer value in said block is converted into a bit string of a variable length integer code; and
upon receiving information indicating said specified node, based on said data for an inverted list, creating a list of identifiers of said search subject data corresponding to said specified node by repeating processing to take out an integer value of said inverted list corresponding to a higher node of said specified node, which corresponds to said position indicated by an integer value of said inverted list corresponding to said specified node until taking out said identifier of said inverted list corresponding to said highest node, wherein
said data search program, in the case where two or more nodes in said taxonomy are specified, takes out a set of search subject data which can be reached from any of said specified nodes, and
in creating a list of said identifiers, in the case where two or more nodes in said taxonomy are specified, acquiring said inverted list corresponding to each said specified node, and in the case of performing processing to take out an integer value of said inverted list corresponding to a higher node of said specified node, which corresponds to said position indicated by an integer value of said inverted list corresponding to said specified node, when among said higher nodes common in a tuple of said specified nodes, taking out an integer value in said inverted list corresponding to a common ancestor node that is a higher node of the lowest order in said taxonomy, takes out said integer value common in a tuple of said specified nodes, and using taken-out said integer value, creates a list of identifiers of said search subject data corresponding to said two or more specified nodes.

11. The non-transitory computer readable recording medium according to any of claim 10, said data search program being a program configured to make a computer further execute:
acquiring a frequency list indicating a frequency, of each node in said taxonomy, corresponding to each of search subject data; and
sorting, in a list of identifiers of one or more said search subject data corresponding to said specified node, said identifiers based on said frequency list.

12. The non-transitory computer readable recording medium according to any of claim 10, said data search program being a program configured to make a computer further execute:
acquiring child node information indicating a set of a child node that is a lower node of each node in said taxonomy; and
taking out, upon receiving a list of identifiers of said search subject data corresponding to said specified nodes, from among each node in said taxonomy, a node which has a frequency no less than a prescribed value in a set of said search subject data indicated by said list, wherein
in taking out said node, positions of said identifier in said inverted list corresponding to said highest node are made to be detected, and based on said child node information, detected said positions are made to be compared with integer values in said inverted list corresponding to a node that is lower by one than said highest node, and processing to calculate a frequency of said node based on accordant integer values is made to be at least performed, and furthermore, with respect to a lower node of said node, integer values corresponding to positions of said identifiers in said inverted list corresponding to a higher node is made to be compared with integer values in said inverted list corresponding to a node that is lower by one than said higher node, and based on accordant integer values, processing to calculate a frequency of said node that is lower by one is made to be performed by 0 times or more, and thereby, a frequency of said each node in said search subject data is made to be calculated.

* * * * *